United States Patent [19]

Wadsworth et al.

[11] Patent Number: 5,686,050

[45] Date of Patent: *Nov. 11, 1997

[54] METHOD AND APPARATUS FOR THE ELECTROSTATIC CHARGING OF A WEB OR FILM

[75] Inventors: Larry C. Wadsworth; Peter Ping-yi Tsai, both of Knoxville, Tenn.

[73] Assignee: The University of Tennessee Research Corporation, Knoxville, Tenn.

[*] Notice: The term of this patent shall not extend beyond the expiration date of Pat. No. 5,401,446.

[21] Appl. No.: 411,486

[22] Filed: Mar. 28, 1995

Related U.S. Application Data

[63] Continuation-in-part of Ser. No. 958,958, Oct. 9, 1992, Pat. No. 5,401,446.

[51] Int. Cl.$^6$ .................. B01J 15/00; B01J 19/12
[52] U.S. Cl. .................. 422/186.05; 422/907; 361/225; 361/230; 204/164
[58] Field of Search ................. 422/186.05, 907; 361/225, 230; 204/164

[56] References Cited

U.S. PATENT DOCUMENTS

| | | | |
|---|---|---|---|
| 1,169,428 | 1/1916 | Rogers | 361/213 |
| 1,394,064 | 10/1921 | Chapman | 361/214 |
| 2,327,695 | 8/1943 | Beregh | 175/264 |
| 2,333,213 | 11/1943 | Slayter | 175/264 |
| 2,740,184 | 4/1956 | Thomas | 28/78 |
| 2,946,541 | 7/1960 | Boyd | 244/42 |
| 2,969,463 | 1/1961 | McDonald | 250/49.5 |
| 3,067,119 | 12/1962 | Ramaika | 204/168 |
| 3,095,163 | 6/1963 | Hill | 244/12 |
| 3,111,605 | 11/1963 | Muller et al. | 361/213 |
| 3,162,398 | 12/1964 | Clauser et al. | 244/205 |
| 3,274,088 | 9/1966 | Wolinski | 204/165 |
| 3,274,090 | 9/1966 | Amborski | 204/165 |
| 3,281,347 | 10/1966 | Winder | 204/168 |

(List continued on next page.)

FOREIGN PATENT DOCUMENTS

| | | |
|---|---|---|
| 068775 | 1/1983 | European Pat. Off. . |
| 117561 | 9/1984 | European Pat. Off. . |
| 245108 | 11/1987 | European Pat. Off. . |
| 305620 | 8/1989 | European Pat. Off. . |
| 448929 | 10/1991 | European Pat. Off. . |
| 1914780 | 10/1970 | Germany . |
| 292582 | 8/1991 | Germany . |
| 59-33250 | 12/1978 | Japan . |
| 0200529 | 11/1983 | Japan . |
| 58-200529 | 11/1983 | Japan . |
| 1177374 | 8/1986 | Japan . |
| 61-177374 | 8/1986 | Japan . |
| 61-200133 | 9/1986 | Japan . |
| 62-2544 | 1/1987 | Japan . |
| 62-235339 | 10/1987 | Japan . |
| 0312223 | 12/1990 | Japan . |
| 2-312223 | 12/1990 | Japan . |
| 4-225226 | 8/1992 | Japan . |
| 480202 | 8/1975 | U.S.S.R. . |
| 1493183 | 11/1977 | United Kingdom . |
| WO 94/28568 | 12/1994 | WIPO . |

OTHER PUBLICATIONS

Adams, J., "Specialty Nonwovens with Enhanced Filtration Performance", *INDA Association of the Nonwoven Fabrics Industry* (Mar. 12–14–, 1991).

Ando, Katsutoshi, "Synthetic Electret Filter Media for HEPA Filtration", *INDA Association of the Nonwoven Fabrics Industry* (Undated).

(List continued on next page.)

*Primary Examiner*—Charles T. Jordan
*Assistant Examiner*—Daniel Jenkins
*Attorney, Agent, or Firm*—Weiser and Associates P.C.

[57] ABSTRACT

A web or film is electrostatically charged by sequentially subjecting the web or film to a series of electric fields such that adjacent electric fields have substantially opposite polarities. Both a method and apparatus are disclosed for charging the web or film.

83 Claims, 8 Drawing Sheets

U.S. PATENT DOCUMENTS

| | | | |
|---|---|---|---|
| 3,308,045 | 3/1967 | Sullivan | 204/165 |
| 3,308,344 | 3/1967 | Smith et al. | 361/213 |
| 3,360,220 | 12/1967 | Meyer | 244/42 |
| 3,503,859 | 3/1970 | Goncarovs et al. | 204/165 |
| 3,507,348 | 4/1970 | Aronson | 180/65 |
| 3,507,763 | 4/1970 | McBride | 204/169 |
| 3,510,094 | 5/1970 | Clark | 244/130 |
| 3,643,128 | 2/1972 | Testone | 244/42 |
| 3,661,735 | 5/1972 | Drelich | 204/165 |
| 3,705,844 | 12/1972 | Haas | 204/312 |
| 3,777,164 | 12/1973 | Osman | 250/531 |
| 3,959,104 | 5/1976 | Fales | 204/164 |
| 4,048,364 | 9/1977 | Harding et al. | 428/113 |
| 4,088,731 | 5/1978 | Groome | 264/282 |
| 4,215,682 | 8/1980 | Kubik et al. | 128/205.29 |
| 4,239,973 | 12/1980 | Kolbe et al. | 250/531 |
| 4,273,635 | 6/1981 | Beraud et al. | 204/165 |
| 4,284,490 | 8/1981 | Weber | 204/298 |
| 4,375,718 | 3/1983 | Wadsworth | 29/592 E |
| 4,419,869 | 12/1983 | Sando et al. | 68/5 D |
| 4,426,597 | 1/1984 | Denoyer et al. | 313/231.41 |
| 4,464,223 | 8/1984 | Gorin | 156/643 |
| 4,465,547 | 8/1984 | Belke, Jr. et al. | 156/629 |
| 4,469,932 | 9/1984 | Spiegelberg et al. | 219/121 PA |
| 4,504,349 | 3/1985 | Ueno et al. | 156/272.6 |
| 4,513,049 | 4/1985 | Yamasaki et al. | 428/194 |
| 4,534,842 | 8/1985 | Arnal et al. | 204/192 E |
| 4,534,918 | 8/1985 | Forrest, Jr. | 264/22 |
| 4,576,692 | 3/1986 | Fukuta et al. | 204/165 |
| 4,588,537 | 5/1986 | Klasse et al. | 264/22 |
| 4,590,042 | 5/1986 | Drage | 422/186.06 |
| 4,592,815 | 6/1986 | Nakao | 204/165 |
| 4,626,263 | 12/1986 | Inoue et al. | 55/155 |
| 4,668,366 | 5/1987 | Zarowin | 204/192.1 |
| 4,687,573 | 8/1987 | Miller et al. | 210/143 |
| 4,771,730 | 9/1988 | Tezuka | 118/723 |
| 4,801,435 | 1/1989 | Tylko | 422/186.04 |
| 4,804,431 | 2/1989 | Ribner | 156/345 |
| 4,874,659 | 10/1989 | Ando et al. | 428/221 |
| 4,883,570 | 11/1989 | Efthimion | 204/164 |
| 4,894,131 | 1/1990 | Jacobs et al. | 204/165 |
| 4,904,174 | 2/1990 | Moosmayer et al. | 425/174.8 E |
| 4,919,968 | 4/1990 | Buhl et al. | 427/37 |
| 4,931,135 | 6/1990 | Horiuchi et al. | 156/643 |
| 4,950,531 | 8/1990 | Radwanski | 428/284 |
| 4,968,374 | 11/1990 | Tsukada et al. | 156/345 |
| 4,968,918 | 11/1990 | Kondo et al. | 315/111.21 |
| 4,970,104 | 11/1990 | Radwanski | 428/198 |
| 4,980,022 | 12/1990 | Fujimura et al. | 156/643 |
| 4,989,006 | 1/1991 | Roth | 342/1 |
| 4,997,600 | 3/1991 | Okumura et al. | 264/22 |
| 5,024,819 | 6/1991 | Dintner et al. | 422/186.06 |
| 5,051,159 | 9/1991 | Togashi et al. | 204/165 |
| 5,061,359 | 10/1991 | Babu et al. | 204/298.07 |
| 5,102,496 | 4/1992 | Savas | 156/643 |
| 5,116,444 | 5/1992 | Fox | 156/244.17 |
| 5,122,048 | 6/1992 | Deeds | 425/174.8 E |
| 5,124,173 | 6/1992 | Uchiyama et al. | 427/38 |
| 5,126,635 | 6/1992 | Doehler et al. | 315/111.21 |
| 5,131,992 | 7/1992 | Church et al. | 24/104 |
| 5,131,993 | 7/1992 | Suib | 24/168 |
| 5,147,493 | 9/1992 | Nishimura | 156/345 |
| 5,162,633 | 11/1992 | Sonobe et al. | 219/121.43 |
| 5,163,458 | 11/1992 | Monroe | 134/1 |
| 5,185,132 | 2/1993 | Horilke et al. | 422/186.05 |
| 5,213,658 | 5/1993 | Ishida | 156/643 |
| 5,221,427 | 6/1993 | Koinuma et al. | 156/643 |
| 5,225,659 | 7/1993 | Kusano et al. | 249/121.59 |
| 5,227,172 | 7/1993 | Deeds | 425/72.2 |
| 5,244,482 | 9/1993 | Hassenboehler, Jr. et al. | 55/528 |
| 5,252,178 | 10/1993 | Moslehi | 156/643 |
| 5,261,965 | 11/1993 | Moslehi | 134/1 |
| 5,266,153 | 11/1993 | Thomas | 156/643 |
| 5,270,137 | 12/1993 | Kubota | 429/249 |
| 5,272,417 | 12/1993 | Ohmi | 315/111.21 |
| 5,275,665 | 1/1994 | Okazaki et al. | 118/723 E |
| 5,309,063 | 5/1994 | Singh | 315/111.51 |
| 5,316,739 | 5/1994 | Yoshikawa et al. | 422/186.05 |
| 5,387,842 | 2/1995 | Roth et al. | 315/111.21 |
| 5,401,446 | 3/1995 | Tsai et al. | 264/22 |
| 5,403,453 | 4/1995 | Roth et al. | 204/164 |
| 5,414,324 | 5/1995 | Roth et al. | 315/111.21 |
| 5,415,719 | 5/1995 | Akimoto | 156/345 |
| 5,441,550 | 8/1995 | Hassenboehler, Jr. et al. | 55/486 |
| 5,443,606 | 8/1995 | Hassenboehler, Jr. et al. | 55/486 |
| 5,456,796 | 10/1995 | Gupta et al. | 156/643.1 |
| 5,456,972 | 10/1995 | Roth et al. | 428/224 |
| 5,464,499 | 11/1995 | Moslehi et al. | 216/71 |
| 5,507,874 | 4/1996 | Su et al. | 134/1 |
| 5,531,862 | 7/1996 | Otsubo et al. | 156/643.1 |

OTHER PUBLICATIONS

Denes, L. et al., "Laser Gain Characterization of Near–Atmospheric $CO_2$:$N_2$:He Glows in a Planar Electrode Geometry", *J. Appl. Phys.*, vol. 44, No. 9, pp. 4125–4136 (Sep., 1973).

Egitto, F. et al., "Plasma Modification of Polymer Surfaces for Adhesion Improvement", *IBM J. Res. Develop.*, vol. 38, No. 4, pp. 423–439 (Jul. 1994).

Eliasson, B. et al., "The Silent Discharge and its Application to Ozone and Excimer Formation", *Nonequilibrium Processes in Partially Ionized Gases*, pp. 401–410, Plenum Press, N.Y. (1990).

Kanazawa, S. et al., "Stable Glow Plasma at Atmospheric Pressure", *J. Phys. D: Appl. Phys.*, vol. 21, pp. 838–840 (1988).

Kanda, N. et al., "Atmospheric Pressure Glow Plasma and its Application to Surface Treatment and Film Deposition", *International Symposium on Plasma Chemistry*, Symposium Proceedings, vol. 3, Bochum, Germany (Aug. 4–9, 1991).

Kim, S., "Surface Modification of Polypropylene in an Impulse Corona Discharge", *Korean Journal of Chemical Engineering* 13(1), pp. 97–100.

Kogoma, M. et al., "Wettability Control of a Plastic Surface by $CF_4$–$O_2$ Plasma and Its Etching Effect", *J. Phys. D: Appl. Phys.*, vol. 20 (1987).

Liu, C., "Plasma–Related Characteristics of a Steady–State Glow Discharge at Atmospheric Pressure", Presented at the 1993 Sigma XI Graduate Student Paper Comp. The Univ. of Tennessee, Knoxville, TN (Mar. 4, 1993).

Liu, C. and Roth, J.R., "Characteristics of a Steady–State, Low Power Glow Discharge at Atmospheric Pressure", *Bulletin of the Am. Phys. Society, Series II*, vol. 37, No. 6, p. 1563 et seq. (Nov., 1992).

Malik, M.R. et al., "Ion Wind Drag Reduction", *AIAA 21st Aerospace Sciences Meeting* (AIAA–83–0231), Reno, Nevada (Jan. 10–13, 1983).

Prinz, E. et al., "Verbundprojekt: Oberflachenbeschichtung mit transienten Glimmentladungen bei Atmospharendruck–Teilvorhaben: Up–scaling der Grundsatzuntersuchung an laufenden Kunststoffbahmen", Statusseminar, Oberflachen–un Schichttechnologien, Mainz, Germany (May 29–31, 1995).

Rakowski, W., "Plasma Modification of Wool Under Industiral Conditions", *Melliand Textilberichte*, vol. 70, pp. 780–785 (1989).

Rakowski, W., "Effect and Cost of Plasma Treatment of Polypropylene Melt blown Webs", *Second Annual TANDEC Conference* (Oct. 13–16, 1992).

Reitz, H. et al., "Power Modulation for Dielectric Barrier-Discharges", Paper presented at Twentieth Power Modulator Symposium (1992).

Roth, J.R. et al., "Experimental Generation of a Steady-State Glow Discharge at Atmospheric Pressure", *1992* (19th) *IEEE Int. Conference on Plasma Science,* Conference Record–Abstracts, Paper 5P–21, IEEE Catalog No. 91–TH0460–6, ISBN 0–7803–0716–X, pp. 170–171, Tampa, FL (Jun. 1–3, 1992).

Roth, J.R. et al., "Plasma–Related Characteristics of a Steady–State Glow Discharge at Atmospheric Pressure", Paper 2P–18, Proc. 1993 IEEE Int. Conf. on Plasma Science, Vancouver, B.C. IEEE Catalog No. 93–CH3334–0, ISBN 0–7803–1360–7, p. 129 (1993).

Roth, J.R. et al., "Preliminary Measurements of the Plasma Properties of a One Atmospher Glow Discharge Plasma", Paper presented at 35th Ann. Meeting of APS Div. of Plasma Physics, *APS Bulletin,* Series II, vol. 38, No. 10, No. 10, p. 1901, St. Louis, MO (Nov. 1–5, 1993).

Salge, J., "Plasma–Assisted Deposition at Atmospheric Pressure", *Journal De Physique IV,* Symposium C5–583, Supplement to Journal de Physique II, vol. 5 (Jun., 1995).

Salge, J. et al., "Verbundproject: Oberflachenbeschichtung mit transienten Gimmentladungen bei Atmospharendruk Teilvorhaben: Grundsatzuntersuchungen" *Institut fur Hochspannungstechnik, TU Braunschweig,* Germany (1996).

Sawada, Y. et al., "A New Approach to the Copper/Epoxy Joint Using Atmospheric Pressure Glow Discharge", *J. Adhesion,* vol. 53, pp. 173–182 (1995).

Schwab, H., "Some Properties of Radio Frequency Gas Discharges in Air at Atmospheric Pressure", *Proceedings of the IEEE,* vol. 59, No. 4 (Apr. 1971).

Szucht, E., "contribution to the Production of Melt–Blown Nonwovens", *Melliand English* – Translation of Milliland Textiberichte 72, p. 270 (Apr., 1991).

Van Turnhout, Jr., "Electret Filters for High–Efficiency Air Cleaning", *Journal of Electrostatics,* 8, pp. 369–379 (1980).

Von Engel, A. et al., "On the Glow Discharge At High Pressure", *Ziet, fur Physik,* vol. 85, pp. 144–160 (1993); including an Enlish language translation of the original German text.

Wakida, T. et al., "Changes in Surface Properties of Poly-(ethylene terephthalate) Treated with Low Temperture Plasma: Effect of Pretreatment with Dimehtylformamide", *Sen–I Gakkaishi,* vol. 42, No. 2 (1986).

Wakida, T. et al., "Surface Free Energy of Poly(ethylene Terephthalate) and Nylon 6 Films Treated With Low Temperature Plasma", *Sen–I Gakkaishi,* vol. 43, No. 7 (1987).

Wood, O.R. et al., "High–Pressure Laser Action in 13 Gases with Transverse Excitation", *Applied Physics Letters,* vol. 18, No. 4, pp. 112–115 Feb. 15, 1971).

Yokoyama, T. et al., "The Mechanism of the Stabilization of Glow Plasma at Atmospheric Pressure", *J. Physics D.; Appl. Phys.,* vol. 23, pp. 1125–1128 (1990).

METHOD AND APPARATUS FOR THE ELECTROSTATIC CHARGING OF A WEB OR FILM

RELATED CASES

This is a continuation-in-part of U.S. patent application Ser. No. 07/958,958, filed Oct. 9, 1992, now U.S. Pat. No. 5,401,446, issued Mar. 28, 1995.

FIELD OF THE INVENTION

The present invention relates to methods and apparatus for forming electrostatic charges on a web or film and the webs and films formed therefrom. More specifically, the invention relates to the cold electrostatic charging of webs or films.

BACKGROUND OF THE INVENTION

Electrically charged fibrous materials to be used as a filtration medium have been known for some time. In U.S. Pat. No. 2,740,184, Thomas discloses a process of charging thermoplastic, fibrous webs by softening the fibers in the webs with heat and, while such fibers are soft, subjecting them to suitable electrostatic field to produce a charged web.

U.S. Pat. No. 4,215,682 to Kubik, et al., discloses methods for the preparation of electrically charged meltblown fibers in which the meltblown fibers are charged with an electrostatic charge immediately after they are formed and then deposited in a web. Similar hot charging processes are disclosed, for example, in U.S. Pat. No. 4,904,174 to Moosmayer, et al., and U.S. Pat. No. 5,122,048 to Deeds.

Webs charged by such hot charging methods do not have the charge density that is necessary to obtain the desired filtration of particles from air flows or other fluid flows. In addition, the currently available hot charging methods are inconvenient to set up, as in the vicinity of the spinnerets, or require the additional expenditure of energy to reheat the web to a temperature suitable for charging.

There are also several cold charging processes for the preparation of charged webs. For example, U.S. Pat. No. 4,375,718 to Wadsworth, et al., and U.S. Pat. No. 4,588,537 to Klaase, et al., describe processes for the corona charging of combined webs made from layers of materials with differing conductivities. U.S. Pat. No. 4,592,815 to Nakao describes placing a nonconductive web between the surface of a grounded metal electrode and a series of discharge electrodes.

The currently available methods for cold charging a web also have problems developing the desired charge densities and, in addition, suffer from the added problem of having the charge bleed off the web with time.

SUMMARY OF THE INVENTION

It is an object of the present invention to provide a method and apparatus for charging a web or film without the inconvenience and expense of hot charging methods.

It is a further object of the present invention to provide a method and apparatus for charging a web or film such that the charge does not bleed off as in prior cold charged webs or films.

These and other objects which will become apparent to one skilled in this art are achieved with our discovery that a suitable web or film may be conveniently cold charged by sequentially subjecting the web or film to plural electric fields such that adjacent electric fields have substantially opposite polarities with respect to each other. Thus, one side of the web or film is initially subjected to a positive charge while the other side of the web or film is initially subjected to a negative charge. Then, the first side of the web or film is subjected to a negative charge and the other side of the web or film is subjected to a positive charge. Such webs or films as are produced by the methods and apparatus of the present invention have relatively high charge densities and in the case of composites or laminates containing conductive films or fibers, do not exhibit attendant surface static electrical charge which would be inappropriate for use in operating rooms or other combustible environments.

For the purposes of the discussion which is to follow and for use in the claims, the terms "positive" and "negative" are meant to be relative terms. For example, a pair of electrodes will have a positive electrode and a negative electrode any time there is a difference in potential between the two electrodes. The positive electrode, for the purposes of this discussion, will be the electrode with the more positive (or less negative) potential, while the negative electrode will be the electrode with the more negative (or less positive) potential.

Also, it is well known to practitioners in the art that the techniques for charging webs may be effectively used to charge films and vice versa. Therefore, for purposes of the discussion which is to follow and for use in the claims, the terms "web" and "film" will be considered to be interchangeable and will be generically referred to by the term "web".

The present invention provides a method for charging a web having first and second sides. The method comprises the steps of, first, inducing a negative charge adjacent the first side of the web, and a positive charge adjacent the second side of the web, and, then, inducing a positive charge adjacent the first side of the web, and a negative charge adjacent the second side of the web (or vice versa). The present invention also provides that the method comprises sequentially inducing, a plurality of times, a charge adjacent the first side of the web, wherein the charge after inducing is substantially opposite the charge adjacent the first side of the web immediately prior to inducing, and inducing a charge adjacent the second side of the web wherein the charge after inducing is substantially opposite the charge adjacent the second side of the web immediately prior to inducing.

In a preferred embodiment of the invention, the web is subjected to electric fields which are between about 1 kVDC/cm and about 16 kVDC/cm. In a more preferred embodiment of the invention, the web is subjected to electric fields which are between about 4 kVDC/cm and about 13 kVDC/cm. In a most preferred embodiment of the invention, the web is subjected to electric fields which are about between about 7 and 12 kVDC/cm.

The present invention also provides for an apparatus for applying an electrostatic charge to a web having first and second sides. The apparatus comprises a first charging means for inducing a negative charge adjacent the first side of the web and a positive charge adjacent the second side of the web, and, preferably, at least a second charging means for inducing a positive charge adjacent the first side of the web and a negative charge adjacent the second side of the web.

In a preferred embodiment of the invention, the apparatus includes a plurality of charging means for inducing a charge adjacent the first side of the web, wherein the charge after inducing is substantially opposite the charge adjacent the first side of the web immediately prior to the web being subjected to each of the plurality of means for inducing, and for inducing a charge adjacent the second side of the web wherein the charge after inducing is substantially opposite the charge adjacent the second side of the web immediately prior to the web being subjected to each of the plurality of means for inducing.

In a further preferred embodiment of the apparatus, the web is a moving sheet web and the apparatus further comprises means for feeding the web to the first charging means, and means for taking up the web from the plurality of charging means for inducing.

In additional preferred embodiments of the invention, the charging means generate electric fields of between about 1 kVDC/cm and about 16 kVDC/cm. In a more preferred embodiment of the invention, the charging means generate electric fields which are between about 4 kVDC/cm and about 13 kVDC/cm. In a most preferred embodiment of the invention, the charging means generate electric fields which are between about 7 kVDC/cm and 12 kVDC/cm.

It has also been discovered by the inventors that webs may be effectively charged by an apparatus comprising a web travelling over a biased metal or otherwise conductive drum or roller and in the vicinity of a biased or grounded charging bar. Such an apparatus produces suitably charged webs after a single pass of the web through the apparatus. The webs produced are bipolar and show high filtering efficiency. Previously, charging apparatus required that charging drums be grounded only. Moreover, such results are achievable at elevated temperatures (up to 150° F., or even higher) and elevated humidities (up to 95%), making such techniques more versatile and less susceptible to variation responsive to changes in temperature and humidity.

The charging seen when using an apparatus of the present invention is in contrast to the charging of a web according to the prior art as illustrated by U.S. Pat. No. 4,592,815 to Nakao. The apparatus shown in U.S. Pat. No. 4,592,815 charges a web by placing it in contact with a drum and beneath a series of charging bars arranged in a circular pattern about the drum. The bars are placed at a potential and the drum is maintained at a ground. The electrical fields from charging bars are driven together near the surface of a web and the drum. Thus, the fields are very concentrated near the surface of the web. Even at low electric field levels, the concentration of electric field near the surface of the web may be sufficient to cause arcing from the charging bars to the drum. Thus, it is often difficult to produce a web by the method of U.S. Pat. No. 4,592,815 without grounding the drum or cylinder.

In contrast, the method of the present invention produces webs without the need to ground the drum or roller. The electric field between a single charging bar and a drum is more spread out across the surface of a web. Therefore, the drum may be either grounded (as in U.S. Pat. No. 4,592,815) or biased. A bias on the drum may then be effectively used to control the polarity and charge density on both sides of the web. Hence, the filtration efficiency and charge retention of the web are improved.

It has further been discovered that webs may be effectively charged by an apparatus comprising a charging bar having an applied voltage and a charging shell substantially surrounding and apart from the charging bar. The sheet web or film is positioned between the charging bar and the charging shell, and is not in contact with the charging bar or the charging shell. The sheet may be, and preferably is a moving sheet. Therefore, the apparatus further comprises means for feeding the sheet to a position between the charging bar and the charging shell and means for taking up the sheet from a position between the charging bar and the charging shell. In the use of the apparatus, the charging shell may be grounded or biased to an opposite polarity with respect to the charging bar. Again, the webs produced using the above apparatus are bipolar and show high filtering efficiency.

It has further been discovered that combinations of the foregoing methods (and apparatus) for charging webs can be employed, yielding webs with enhanced properties. For example, combining a first charging with an apparatus using a charging bar and a charging shell substantially surrounding and apart from the charging bar, with a second charging with an apparatus using a biased metal or otherwise conductive drum or roller and a biased or grounded charging bar, can provide an enhanced result for relatively thin webs.

The present invention is suitable for charging nonwoven webs or films of generally nonconductive polymeric materials. The webs or films are generally hydrophobic, but may be a mixture of hydrophobic and hydrophilic polymeric (synthetic) materials which, overall, have hydrophobic characteristics. The mixture may include layers of different hydrophobic and hydrophilic properties, or the fibers of such different properties may be comingled or intertwined (i.e., mixed). The polymeric materials can be selected from the group consisting of polypropylene (PP), recycled and virgin polyethylene terephthalate (PET), all types of polyethylene (PE), such as linear low density polyethylene (LLDPE), polybutylene terephthalate (PBT), polycarbonates, polychlorotrifluoroethylene (PCTFE), and polycyclohexyldimethylene terephthalate (PCT).

In addition, the present invention is suitable for charging composite webs containing both conductive and nonconductive fibers such as meltblown/cotton/meltblown thermally bonded webs or meltblown/cotton hydroentangled or needle-punched webs, or hydroentangled mixtures of carded polyester staple fibers and wood tissue, such as SONTARA webs (Du Pont), as well as deep-grooved polyester fibers such as 4DG fibers (Eastman Chemical Company). The composite webs (and the laminates) may contain one or more layers of cellulosic fibers like cotton, ramie, hemp, jute, flax, kenaf, bagasse, and eucalyptus, including derivatives of cellulose such as rayon, or many others, as well as "Tencel", a compartively new fiber of Courtaulds P. C. (made from wood pulp). It has been found that when polymeric films like polypropylene films are treated in accordance with the invention, they can be especially well suited for making film laminates where the contacting surfaces will have charges of opposite polarity.

It has also been discovered by the inventors that a web comprising a mixture of polyolefins including from about 99 wt.% to about 70 wt. % of a first polyolefin, and from about 1 wt. % to about 30 wt. % of a second polyolefin modified by grafting from about 3 wt. % to about 10 wt. %, based on the weight of the second polyolefin, of acrylic acid, or some other anionic or cationic (e.g., quaternary ammonium) groups, to the second polyolefin may be effectively charged. Such webs unexpectedly retain charges far longer than would be expected. In general, it would be expected that webs containing anionic (or cationic) materials would facilitate the movement of the charges through the web resulting in neutralization of the charges and eventual bleed off of the charge. However, the presently disclosed web is effectively charged to significantly increase its filtration efficiency and it has been shown to retain that efficiency even after accelerated aging tests.

In preferred embodiments of the invention, the first and second polyolefins are identical. In a more preferred embodiment, the polyolefins are polypropylene. The present invention also sets forth that the second polyolefin is preferably modified by grafting about 6 wt. % of acrylic acid onto the second polyolefin.

BRIEF DESCRIPTION OF THE DRAWINGS

For further detail regarding the improvements of the present invention, reference is made to the following detailed description of exemplary embodiments, in conjunction with the accompanying drawings in which.

DETAILED DESCRIPTION OF THE INVENTION

Figure 1:
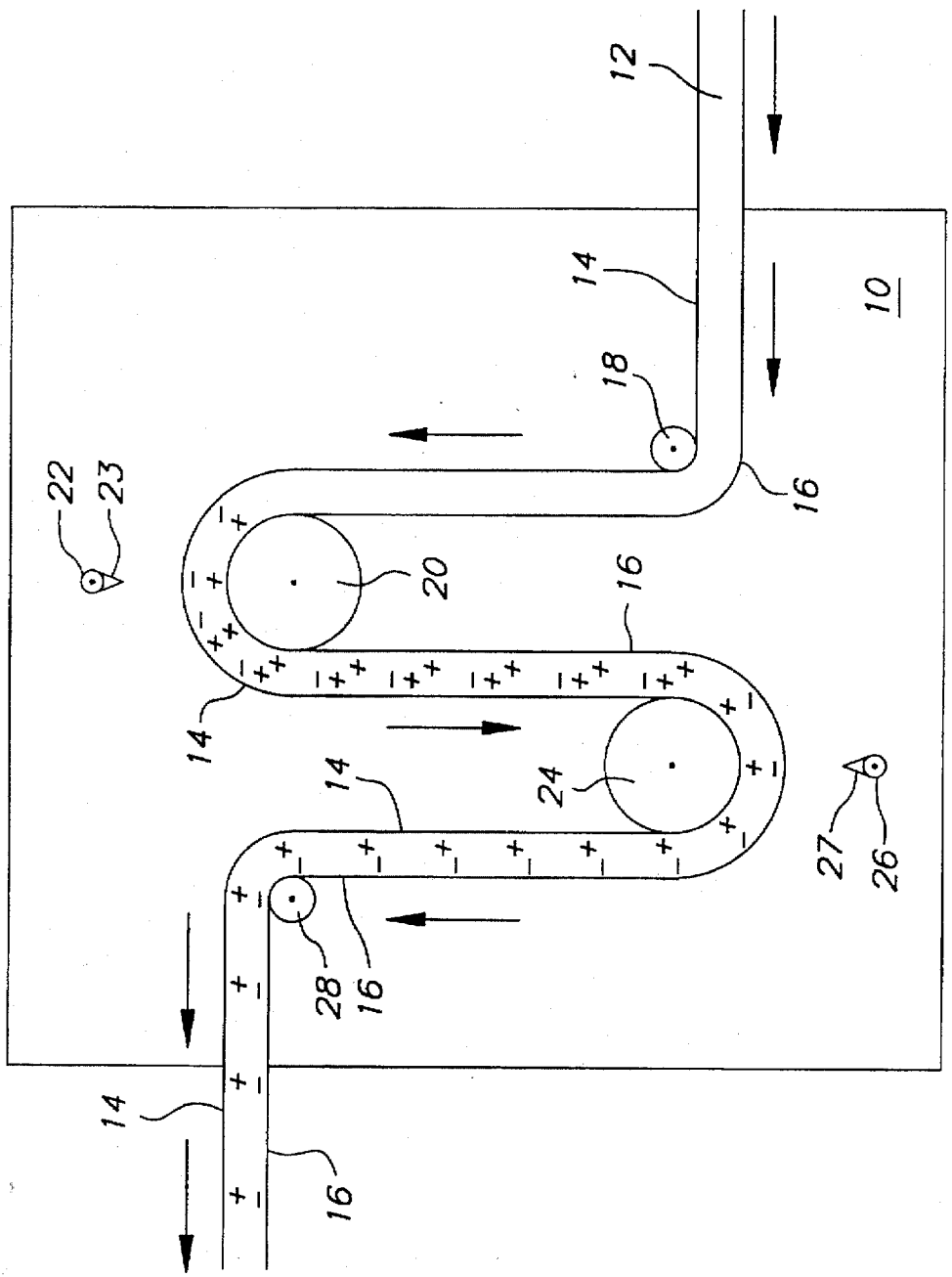
FIG. 1 is a schematic view of one embodiment of the present invention for cold charging a web.

Referring now to the drawings in which like reference characters designate like or corresponding parts throughout the several views, FIG. 1 shows an embodiment of an apparatus 10 for cold charging a web in accordance with the present invention. The depicted apparatus 10 generally comprises an uncharged moving web 12 having a first side 14 and a second side 16. The web 12 may have a triboelectric charge associated with the relative inherent electronegative/ electropositive nature of the polymer. In addition, the web 12 may be a web that has been precharged by either a hot or cold charging process. The web 12 passes into the apparatus 10 with the first side 14 in contact with positioning roller 18. The second side 16 of the web 12 then comes in contact with the first charging drum 20 which rotates with the web 12 and brings the web 12 into a position between the first charging drum 20 and a first charging bar 22.

In the following discussion, the first charging drum 20 is assumed to be "negatively charged" (i.e., at a negative potential) and the first charging bar 22 is assumed to be "positively charged" (i.e., at a positive potential). These assumptions are for the ease of describing the operation of the invention only and are not intended to limit the scope of the invention to those specific relative potentials.

As the web 12 passes between the charging bar 22 and the charging drum 20, an electrostatic charge is developed adjacent the two sides 14 and 16 of the web 12. A relative negative charge is developed adjacent the first side 14 of the web 12 and a relative positive charge is developed adjacent the second side 16 of the web 12. The web 12 then passes on to a "negatively charged" (i.e., at a negative potential) second charging drum 24 and, further, to a position between the charging drum 24 and a second "positively charged" (i.e., at a positive potential) charging bar 26 where the web 12 has the polarity of its charge reversed. This effect is seen in polyolefin fibers but is not always seen in webs prepared from fibers of, for example, polyesters or PCTFE. That is, a relative positive charge is developed adjacent the first side 14 of the web 12 and a relative negative charge is developed adjacent the second side 16 of the web 12. The charged web 12 then passes on to a positioning roller 28 and out of the apparatus.

In the practice of the invention, both of the charging drums 20 and 24 are held at a relative negative charge (or grounded) while the charging bars 22 and 26 are held at a relative positive charge. However, since different sides of the web 12 are in contact with the charging drums (the second side 16 is in contact with the first charging drum 20 and the first side 14 is in contact with the second charging drum 24) the charges adjacent to the sides 14 and 16 of the web 12 are changed during the charging of the web 12 in the apparatus 10. Thus, the first side 14 is first negatively charged and then positively charged, and the second side is first positively charged and then negatively charged.

Without being bound by theory, it is believed that the switch in polarity of the charges adjacent to the sides 14 and 16 of the web 12 contributes to an improvement in the charge density of the charged web as well as an improvement in the lifetime of the charge in the web. The specific reasons for this observed improvement are currently unknown to the inventors.

Figure 2:
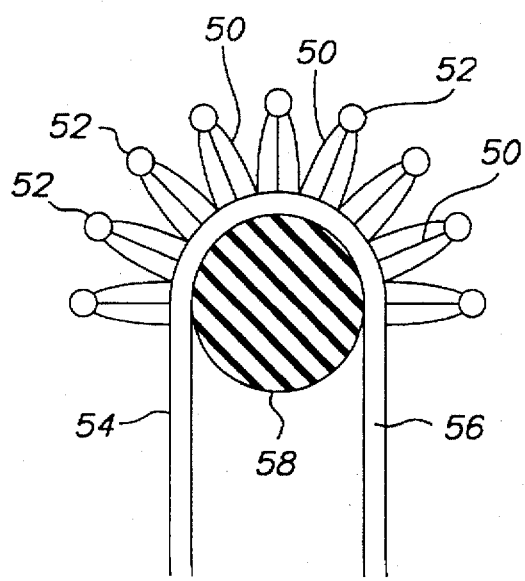
FIG. 2 is a schematic view showing the electrical fields of a method for cold charging a web according to the prior art.

The charging seen when using an apparatus as shown in FIG. 1 is in contrast to the charging of a web according to the prior art as illustrated by U.S. Pat. No. 4,592,815 to Nakao. The apparatus shown in U.S. Pat. No. 4,592,815 charges a web by placing it in contact with a drum and beneath a series of charging bars arranged in a circular pattern about the drum. The bars are charged and the drum is maintained at a ground. As is shown in FIG. 2, the electrical fields 50 from the charging bars 52 are driven together near the surface 54 of the web 56 and the drum 58. Thus, the fields 50 are very concentrated near the surface 54 of the web 56. Even at low electric field levels, the concentration of electric field 50 near the surface 54 of the web 56 may be sufficient to cause arcing from the charging bars 52 to the drum 58. Thus, it is often difficult to produce a web by the method of U.S. Pat. No. 4,592,815 without grounding the drum or cylinder.

Figure 3:
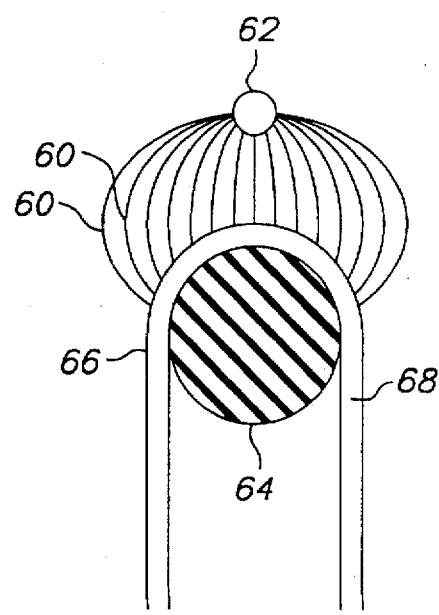
FIG. 3 is a schematic view showing the electrical fields of a method for cold charging a web according to the apparatus shown in FIG. 1.

In contrast, the method of the present invention, as illustrated in the apparatus of FIG. 1, produces webs without the need to ground the drum. As is shown in FIG. 3, the electric field 60 between the single charging bar 62 and the drum 64 is more spread out across the surface 66 of the web 68. The metal or otherwise conductive drum or roller 64 may be either grounded (as in U.S. Pat. No. 4,592,815) or biased.

A bias on the drum 64 is used to control the polarity and charge density on both sides of the web 68. Hence, the filtration efficiency and charge retention of the web are improved.

Figure 4:
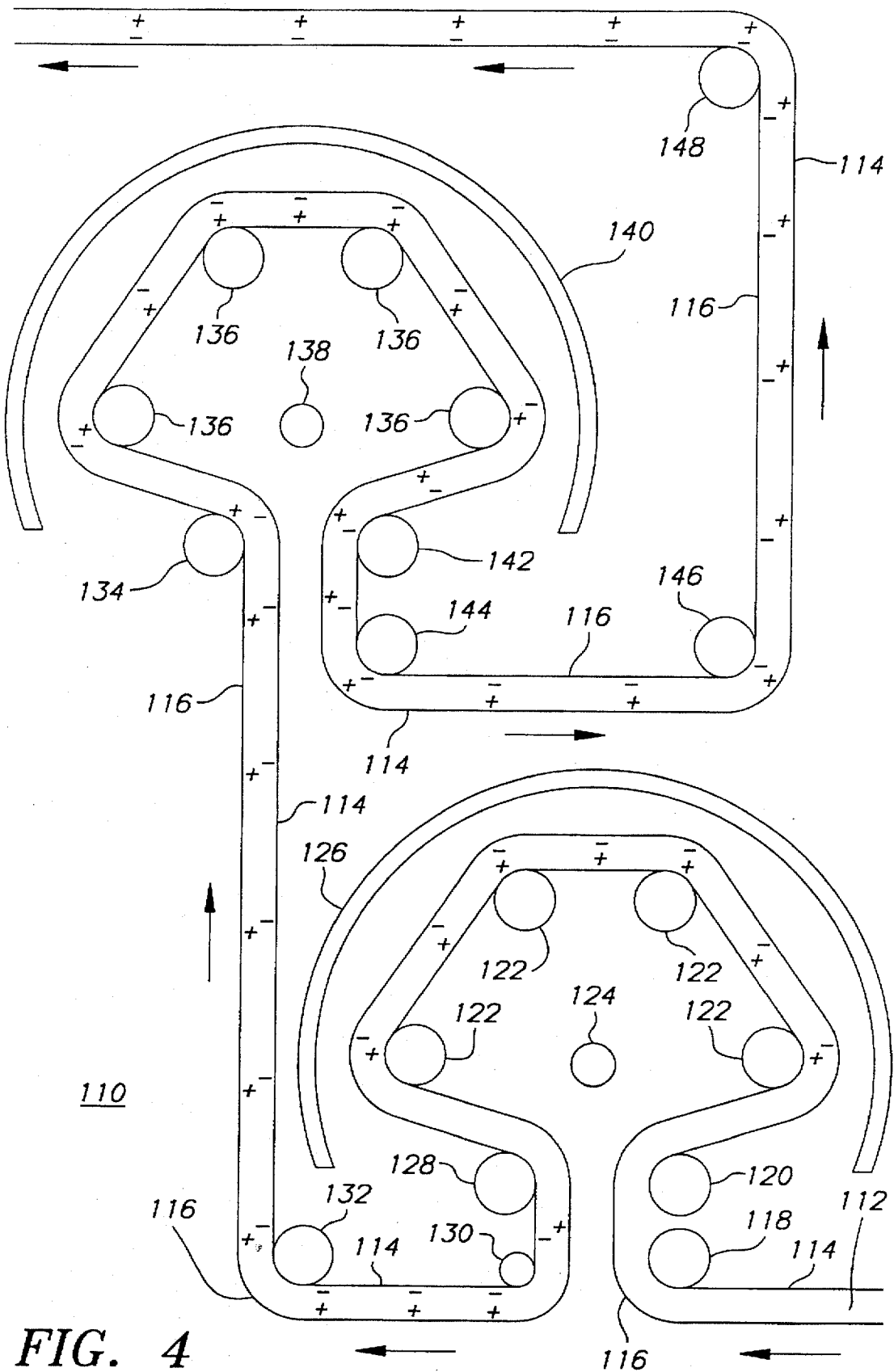
FIG. 4 is a schematic view of another embodiment of the present invention for cold charging a web.

Another embodiment of the invention is shown in FIG. 4 which shows an alternate apparatus 110 for cold charging a web in accordance with the present invention. The depicted apparatus 110 generally comprises an uncharged moving web 112 having a first side 114 and a second side 116. The web 112 may have a triboelectric charge associated with the relative inherent electronegative/electropositive nature of the polymer. In addition, the web 112 may be a web that has been precharged by either a hot or cold charging process. The uncharged web 112 passes into the apparatus 110 with the first side 114 in contact with a first positioning roller 118. The web 112 then passes over a second positioning roller 120 and onto first insulating positioning rollers 122 which position the web 112 between the first charging wire 124 and the first charging shell 126. The rollers 122 are generally made of insulating materials such as wood, plastic, or ceramic.

In the following discussion, the first charging wire 124 is assumed to be "negatively charged" (i.e., at a negative potential) and the first charging shell 126 is assumed to be positively charged (i.e., at a positive potential). These assumptions are for the ease of describing the operation of the invention only and are not intended to limit the scope of the invention to those specific relative potentials.

The charges on the first charging wire 124 and the first charging shell 126 induce a charge in the web 112 such that there is a relative positive charge adjacent the second side 116 of the web 112 and a relative negative charge adjacent the first side 114 of the web 112.

The web 112 then passes on to third, fourth, fifth, and sixth positioning rollers 128–134 before passing onto second insulating positioning rollers 136 which position the web 112 between the second charging wire 138 and the second charging shell 140. Again, the rollers 136 are generally made of insulating materials such as wood, plastic, or ceramic.

The charges (i.e., potentials) on the second charging wire 138 and the second charging shell 140 induce a change in the polarity of the charge in the web 112 such that there is a relative negative charge adjacent the second side 116 of the web 112 and a relative positive charge adjacent the first side 114 of the web 112. The web 112 then passes over the positioning rollers 142–148 and out of the apparatus 110.

As. in the apparatus 10 described in FIG. 1, the apparatus 110 of FIG. 4 provides a web which has had the polarity of its charge changed during the charging process. Again, the resulting web retains a long lasting high charge density. This is shown in the increase and the relative stability of the filtration efficiency of webs treated according to the present invention.

Figure 5:
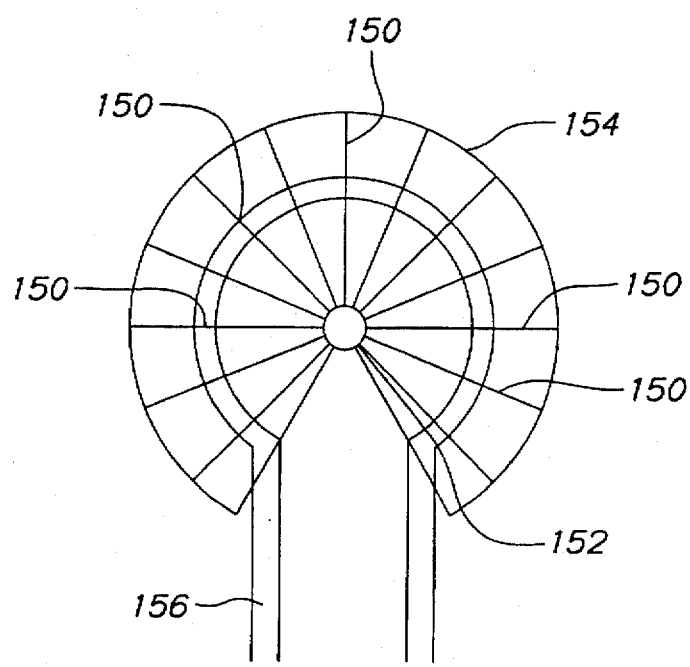
FIG. 5 is a schematic view showing the electrical fields of a method for cold charging a web according to the apparatus shown in FIG. 4.

Again, there is a general decrease in the number and size of pinholes (due to arcing between the drum and the charging bar) in the charged web. As in the apparatus shown in FIG. 1, the apparatus shown in FIG. 4 has a dispersed electric field. As is shown in FIG. 5, the electric field lines 150 from the charging bar 152 to the shell 154 are spread across a rather wide area.

Figure 6:
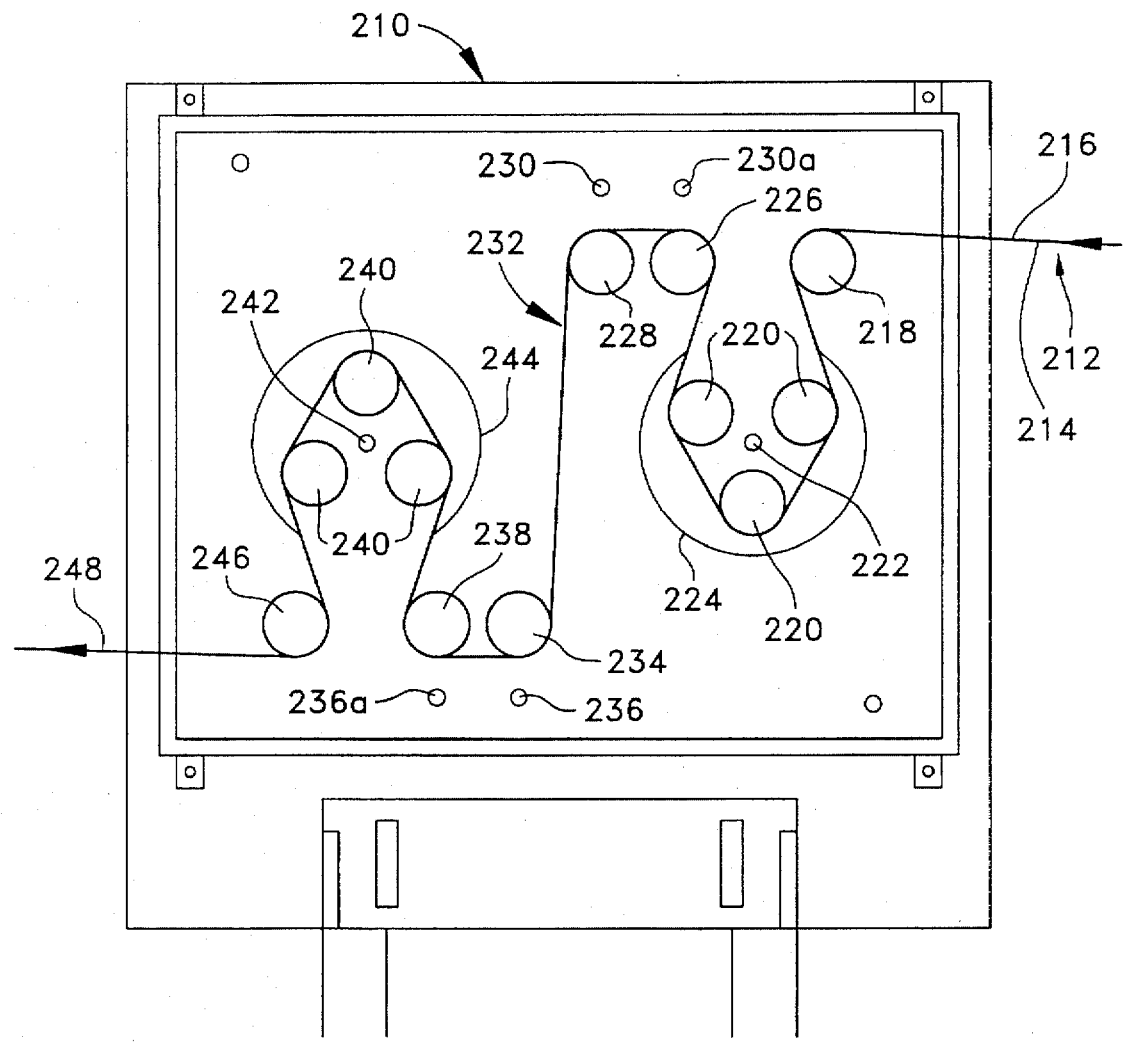
FIG. 6 is a schematic view of an embodiment of the present invention for cold charging a web which permits varied charging of the web using different processes, both alone and in combination.

FIG. 6 shows yet another alternative apparatus 210 for cold charging a web in accordance with the present invention. The apparatus 210 is configured to charge webs using charging techniques which can vary, as desired. This can include the charging of webs with a biased metal or otherwise conductive drum or roller together with a biased or grounded charging bar, similar to the charging technique discussed in conjunction with FIG. 1 of the drawings. This can also include the charging of webs with a charging bar and a charging shell substantially surrounding and apart from the charging bar, similar to the charging technique discussed in conjunction with FIG. 4 of the drawings. This can even include desired combinations of these two charging techniques. Essentially, this is accomplished by activating or deactivating (or connecting or disconnecting) desired sections of the apparatus 210 to achieve the charging technique which is desired.

The apparatus 210 operates upon an uncharged moving web 212 having a first side 214 and a second side 216. The uncharged web 212 enters the apparatus 210, coming into contact with a first positioning roller 218, which may be either an insulative or conductive roller. The web 212 is then passed to a series of insulating positioning rollers 220 which position the web 212 between a charging wire 222 and a first charging shell 224. The web 212 is then passed over a positioning roller 226, and is caused to contact a first charging drum 228, which must be conductive. A charging bar 230 is operatively combined with the charging drum 228.

Following a transition, at 232, the web 212 is caused to contact a second charging drum 234. A charging bar 236 is operatively combined with the charging drum 234, which is conductive. The web 212 is then passed over a positioning roller 238, and is in turn directed to a series of positioning insulating rollers 240 which position the web 212 between a charging wire 242 and a second charging shell 244. Following this, the web 212 is passed over a positioning roller 246, which may be either conductive or nonconductive, and is directed from the apparatus 210, at 248.

It will be appreciated that the apparatus 210 essentially constitutes an operative combination of an apparatus in accordance with FIG. 1 of the drawings (herein referred to as "Technique I"), and an apparatus in accordance with FIG. 4 of the drawings (herein referred to as "Technique II"). Through selective use of the four sections represented by the charging wire 222 and the charging shell 224, the charging bar 230 and the charging drum 228, the charging bar 236 and the charging drum 234, and the charging wire 242 and the charging shell 244, various combinations of the techniques previously described for cold charging a web of material may be developed. This allows the charging technique to be tailored to the type of web (e.g., material, thickness, etc.) which is to be operated upon.

For example, it has been found that relatively thin webs can be more efficiently charged with an apparatus according to FIG. 1 (Technique I). This is achievable by activating the charging bars 230, 236 and the conductive charging drums 228, 234. It has been found that relatively thick webs can be more efficiently charged with an apparatus according to FIG. 4 (Technique II). This is achievable by activating the charging wires 222, 242 and the charging shells 224, 244. It has even been found that combinations of the techniques represented by FIG. 1 and FIG. 4 of the drawings (herein referred to as "Technique III") are useful in certain circumstances. For example, it has been found that thin polypropylene webs (on the order of 20 g/m$^2$ or less) will show a particularly enhanced filtration efficiency (on the order of 91.69%) if charged with a combination of the techniques represented by FIG. 1 and Figure 4 (Technique III). Referring again to FIG. 6, this is achievable by activating the charging wires 222, 242 and the charging bars 230, 236, as well as the charging shells 224, 244 and the charging drums 228, 234, to achieve a charging of the web 212 through combination of the techniques previously described. Alternatively, for certain webs, it has been found to be advantageous to use an apparatus including only one component of an apparatus according to FIG. 1 (Technique I) and only one component of an apparatus according to FIG. 4 (Technique II). Again referring to FIG. 6, and as an example, such an apparatus could include a combination of the charging bar 222 and the charging shell 224, and the charging wire 230 and the charging drum 228. For further flexibility in charging of the web 212, the apparatus 210 can include additional charging wires 230a, 236a associated with corresponding charging drums (in place of the rollers 226, 238), if desired.

The ability to vary charging technique has revealed yet other improvements in implementation. For example, it has been found that when laminated (multilayer) webs are charged with the technique represented by FIG. 1 (Technique I), and the technique represented by FIG. 4 (Technique II), different characteristics result in terms of the filtration efficiency of each of the layers associated with the treated laminated web. Table I illustrates such variation for webs having three layers, five layers and eight layers, respectively.

Definitions: In order to better understand the terms used herein, including the Tables and Examples to be set forth below, the following definitions consistent with the accepted technical definitions in the industry, are submitted.

Filtration Efficiency—is the measure of the ability of a web to remove particles from a flow of (gaseous or liquid) fluid. The filtration efficiency is related to the penetration ability, P, of small particles and is calculated as:

filtration efficiency=(100−$P$)%.

Filter Quality—is another measure of the ability of a web to remove particles from a flow of (gaseous or liquid) fluid. The filter quality, $q_F$, is related to the particle penetration through a web, P and to the pressure drop across the web, $\Delta p$, according to the formula:

$q_F = [\ln(1/P)]/[\Delta p]$.

See William C. Hinds, "Aerosol Technology: Properties, Behavior, and Measurement of Airborne Particles," John Wiley & Sons, New York, p. 170 (1982).

TABLE I

| | | No. | | | | | | |
|---|---|---|---|---|---|---|---|---|
| | | I[a] | | II[b] | | III[c] | | IV[d] |
| | | Number of Layers | | | | | | |
| | | 3 | 3 | 5 | 5 | 5 | 5 | 8 | 8 |
| | | Charging Tech. | | | | | | |
| | | I | II | I | II | I | II | I | II |
| Overall | Filt. Eff. | 98.6 | 99.92 | 98.60 | 99.957 | 94.70 | 94.64 | 99.022 | 99.9771 |
| | $\Delta p$ | 6.9 | 6.9 | 7.2 | 7.4 | 2.4 | 2.3 | 7.7 | 7.4 |
| 1st Layer | Filt. Eff. | 88.2 | 88.9 | 73.5 | 80.4 | 53.35 | 43.5 | 51.1 | 59.4 |
| | $\Delta p$ | 2.4 | 2.2 | 1.4 | 1.6 | 0.6 | 0.6 | 1.1 | 1.1 |
| 2nd Layer | Filt. Eff. | 60.6 | 90.8 | 56.9 | 80.2 | 48.2 | 50.95 | 49.1 | 65.8 |
| | $\Delta p$ | 2.3 | 2.3 | 1.6 | 1.5 | 0.6 | 0.6 | 1.1 | 1.1 |
| 3rd Layer | Filt. Eff. | 82.3 | 88.5 | 47.1 | 85.2 | 49.75 | 50.7 | 33.6 | 74.8 |
| | $\Delta p$ | 2.3 | 2.1 | 1.5 | 1.7 | 0.6 | 0.5 | 1.1 | 1.2 |
| 4th Layer | Filt. Eff. | | | 54.5 | 82.9 | 45.9 | 51.4 | 32.8 | 74.6 |
| | $\Delta p$ | | | 1.6 | 1.6 | 0.5 | 0.6 | 1.1 | 1.2 |
| 5th Layer | Filt. Eff. | | | 67.2 | 83.3 | | 46.5 | 33.5 | 71.9 |
| | $\Delta p$ | | | 1.5 | 1.7 | | 0.6 | 1.1 | 1.1 |
| 6th Layer | Filt. Eff. | | | | | | | 34.3 | 71.3 |
| | $\Delta p$ | | | | | | | 1.1 | 1.2 |
| 7th Layer | Filt. Eff. | | | | | | | 58.0 | 70.3 |
| | $\Delta p$ | | | | | | | 1.1 | 1.1 |
| 8th Layer | Filt Eff. | | | | | | | 54.3 | 73.5 |
| | $\Delta p$ | | | | | | | 1.1 | 1.2 |

[a] 0.9 oz/yd² layers, thickness of each layer is 214 μm (for a single layer, typical filt. eff. = 53.9, typiccal $\Delta p$ = 2.4).
[b] 0.9 oz/yd² layers, thickness of each layer is 281 μm (for a single layer, typical filt. eff. = 32.6, typical $\Delta p$ = 1.5).
[c] 0.9 oz/yd² layers, thickness of each layer is 550 μm (for a single layer, typical filt. eff. = 14.5, typical $\Delta p$ = 0.55).
[d] 0.39 oz/yd² layers, thickness of each layer is 205 μm (for a single layer, typical filt. eff. = 27.5, typical $\Delta p$ = 0.95).

Table I shows that laminated webs treated according to FIG. 1 of the drawings (Technique I) exhibit higher filtration efficiencies for outside layers than for inside layers, while the opposite result is observed for laminated webs treated according to FIG. 4 of the drawings (Technique II).

In order to provide a further understanding of the present invention, the following examples primarily illustrate certain more specific details thereof.

Equipment

Filtration Measurement: A TSI Model 8110 automated filter tester was used for the measurement of media filtration efficiency. Two percent sodium chloride solution (20 g NaCl in 1 liter of water) was aerosolized by an aerosol generator. The NaCl/water drops in aerosol were heated and NaCl crystallites with a 0.1 μm diameter were formed. The mass concentration of NaCl in the air was 101 mg/m$^3$. Photometry was used to detect the volume concentration of the air in the upstream volume of the media ($C_u$) and the volume concentration of the air in the downstream volume of the media ($C_d$). The penetration ability of the NaCl particles was calculated as:

penetration=$P=[C_d C_u](100\%)$, and filtration efficiency was calculated as:

filtration efficiency=$(100-P)\%$.

Surface Charge Potential: A Monroe Model 244 Isoprobe Electrostatic Voltmeter with a 1017E Probe (0.07 in. opening) was connected to a Velmex system which allows webs with dimensions up to 20×38 inches to be scanned with the probe in both the machine (MD) and cross-machine (CD) directions. The measurement system was interfaced with an IBM AT computer using DT 2801 I/O system (Data Translation Inc., Marlborough, Mass.). The average and standard deviation of scanned data were simultaneously computed along with the absolute average (the average of the absolute value of the surface charge potential).

EXAMPLE I

Cold Charging using Contact Cloth: Table II lists the conditions and charging results for a variety of webs charged according to the method disclosed in U.S. Pat. No. 4,375, 718 to Wadsworth, et al., which is incorporated herein by reference. Table III lists the measured surface charge potential for those webs.

TABLE II

| No.[a] | Filt. Eff.[b] | Charging Voltage[c] | Filt. Eff.[d] | Δp | q$_f$ |
|---|---|---|---|---|---|
| 1 | 11.2 | −20 +20 | 63.30 | 0.9 | 1.176 |
| 2 | 45.7 | −20, +20 | 98.708 | 2.2 | 1.977 |
| 3 | 45.83 | −20, +20 | 98.426 | 1.9 | 2.386 |
| 4 | 43.5 | −20, +20 | 99.000 | 2.1 | 2.193 |
| 5 | 24.55 | −20, +20 | 84.775 | 0.9 | 2.091 |
| 6 | 41.55 | −18.5, +20 | 98.460 | 2.45 | 1.703 |
| 7 | 71.65 | −21, +21 | 99.937 | 6.8 | 1.084 |

[a]1 is 1 oz/yd$^2$ LLDPE; 2 is 1 oz/yd$^2$ pp with 10% PP grafted with 6% acrylic acid; 3 is 2 oz/yd$^2$ recycled PET; 4 is 1 oz/yd$^2$ PCT; 5 is 1 oz/yd$^2$ recycled PET; 6 is 1 oz/yd$^2$ PP; 7 is 3 oz/yd$^2$ PP.
[b]Before charging.
[c]kV for top, bottom.
[d]After charging.
[e]MM of H$_2$O.

TABLE III

| | Surface Charge Potential | | | |
|---|---|---|---|---|
| | Screen Side | | Face Side | |
| No.[a] | Arith. Avg. | Abs. Avg. | Arith. Avg. | Abs. Avg. |
| 1 | +206 | 323 | −345 | 360 |
| 2 | +26 | 318 | −99 | 175 |
| 3 | −50 | 456 | +70 | 292 |
| 4 | −207 | 609 | +1031 | 1031 |
| 5 | +137 | 263 | +231 | 425 |
| 6 | +327 | 355 | −153 | 238 |
| 7 | +468 | 1081 | −790 | 878 |

[a]Same samples as in Table II.

Table II shows how the filtering efficiency of various webs can be improved by cold charging according to U.S. Pat. No. 4,375,718. As is shown in Table III, the charging of the webs by the method mostly produces bipolar (i.e., different charges on opposite sides) webs.

EXAMPLE II

Cold Charging using the Apparatus of FIG. 1: Table IV lists the conditions and charging results for a variety of webs charged on an apparatus according to FIG. 1 (Technique I). Table V lists the measured surface charge potential for those webs.

TABLE IV

| No.[a] | Filt. Eff.[b] | Charging Voltage[c] | Filt. Eff.[d] | Δp | q$_f$ |
|---|---|---|---|---|---|
| 8 | 71.65 | +20 (charged 2X) | 99.317 | 6.83 | 0.730 |
| 9 | 71.65 | +20 (charged 1X) | 98.610 | 6.8 | 0.629 |
| 10 | 41.55 | +22 (charged 1X) | 98.308 | 2.4 | 1.700 |
| 11 | 41.55 | +21 (charged 2X) | 98.718 | 2.5 | 1.743 |
| 12 | 76.45 | +20 (charged 2X) | 98.063 | 9.7 | 0.407 |
| 13 | 24.55 | +22 (charged 2X) | 89.010 | 1.1 | 2.007 |
| 14 | 24.55 | +22 (charged 1X) | 90.33 | 1.0 | 2.336 |

[a]8 and 9 are 3 oz/yd$^2$ PP; 10 and 11 are 1 oz/yd$^2$ PP; 12 is a meltblown/cotton/meltblown thermally bonded composite; 13 and 14 are 1 oz/yd$^2$ recycled PET.
[b]Before charging.
[c]Potential on the wire in kV; the rollers were grounded.
[d]After charging.

It is important to note that additional charging operations, performed in series, may be advantageous in some cases (i.e., charged 3×, 4×, 5×, 6×, etc.). This may be of particular interest where the webs are being processed at comparatively higher speeds (e.g., at speeds of 1,000 feet/minute, or more).

TABLE V

| | Surface Charge Potential | | | |
|---|---|---|---|---|
| | Screen Side | | Face Side | |
| No.[a] | Arith. Avg. | Abs. Avg. | Arith. Avg. | Abs. Avg. |
| 8 | +54 | 404 | −465 | 481 |
| 9[b] | +523 | 576 | −637 | 637 |
| 10[b] | +570 | 570 | −670 | 670 |
| 11 | +174 | 239 | −192 | 212 |
| 12 | −9 | 31 | +185 | 185 |
| 13 | −143 | 256 | −178 | 206 |
| 14[b] | 34 | 201 | −179 | 208 |

[a]Same samples as in Table IV.
[b]Single charge with screen side adjacent the roller at the negative potential.

Table IV shows that the process of charging a web with the apparatus of FIG. 1 (Technique I) produces webs with good filtering efficiencies and excellent filtration qualities. In addition, Table V shows that the process produces bipolar webs with good charge differentials between the two sides of the web.

EXAMPLE III

Cold Charging using the Apparatus of FIG. 4: Table VI lists the conditions and charging results for a variety of webs charged on an apparatus according to FIG. 4 (Technique II). Table VII lists the measured surface charge potential for those webs.

TABLE VI

| No.[a] | Filt. Eff.[b] | Charging Voltage[c] | Filt Eff.[d] | $\Delta p$ | $q_f$ |
|---|---|---|---|---|---|
| 15 | 71.65 | +23, −19 (2X) | 99.956 | 6.9 | 1.120 |
| 16 | 71.65 | +21, −19 (1X) | 99.950 | 6.55 | 1.160 |
| 17 | 41.55 | +25, −19 (2X) | 96.278 | 2.3 | 1.431 |
| 18 | 41.55 | +25, −19 (1X) | 95.525 | 2.55 | 1.218 |
| 19 | 24.55 | +25, −19 (2X) | 80.35 | 0.9 | 1.808 |
| 20 | 24.55 | +25, −15 (1X) | 81.90 | 1.0 | 1.709 |

[a]15 and 16 are 3 oz/yd$^2$ PP; 17 and 18 are 1 oz/yd$^2$ PP; 19 and 20 are 1 oz/yd$^2$ recycle PET.
[b]Before charging.
[c]kV for wire, shell (number of chargings).
[d]After charging.

TABLE VII

| | Surface Charge Potential | | | |
|---|---|---|---|---|
| | Screen Side | | Face Side | |
| No.[a] | Arith. Avg. | Abs. Avg. | Arith. Avg. | Abs. Avg. |
| 15 | +1062 | 1099 | −2208 | 2208 |
| 16[b] | +1235 | 1239 | −1678 | 1678 |
| 17 | +183 | 297 | −30 | 166 |
| 18[b] | −37 | 183 | −275 | 294 |
| 19 | −179 | 244 | −66 | 164 |
| 20[b] | −233 | 283 | −126 | 186 |

[a]Same samples as in Table IV.
[b]Single charge with screen side adjacent the shell at the negative potential.

Table VI shows that the process of charging a web with the apparatus of FIG. 4 (Technique II) produces webs with good filtering efficiencies and excellent filtration qualities for high basis weight webs (i.e., greater than about 1.5 oz/yd$^2$) and produces webs with adequate filtration efficiencies and filtration qualities for lower basis weight webs (i.e. less than about 1.5 oz/yd$^2$). In addition, Table VII shows that the process produces bipolar webs with good charge differentials between the two sides of the web. While the "cross-over figure" of 1.5 oz/yd$^2$ appears to be particularly relevant to meltblown polypropylene webs, this figure may differ from material to material, and can be readily determined by testing of the web involved.

EXAMPLE IV

Accelerated Aging Tests: Samples of the various webs were subjected to a temperature of 137° C. for 10 minutes to simulate the effects of aging on the charge of the web. The results are shown in Table VIII.

TABLE VIII

| No. | Filt. Eff.[a] | Filt. Eff.[b] | $\Delta p^a$ | $\Delta p^b$ | $q_f^a$ | $q_f^b$ |
|---|---|---|---|---|---|---|
| 2 | 98.708 | 92.390 | 2.2 | 2.1 | 1.977 | 1.227 |
| 6 | 98.460 | 97.370 | 2.45 | 2.2 | 1.703 | 1.653 |
| 7 | 99.937 | 99.866 | 6.8 | 6.1 | 1.084 | 1.084 |
| 8 | 99.317 | 99.279 | 6.83 | 6.1 | 0.730 | 0.809 |
| 9 | 98.610 | 98.588 | 6.8 | 6.2 | 0.629 | 0.687 |
| 10 | 98.308 | 97.583 | 2.4 | 2.2 | 1.700 | 1.692 |
| 11 | 98.718 | 97.178 | 2.5 | 2.2 | 1.743 | 1.622 |
| 12 | 98.063 | 96.143 | 9.7 | 9.8 | 0.407 | 0.332 |
| 15 | 99.956 | 99.925 | 6.9 | 6.3 | 1.120 | 1.142 |
| 16 | 99.950 | 99.886 | 6.55 | 6.0 | 1.160 | 1.129 |
| 17 | 96.278 | 95.858 | 2.3 | 2.2 | 1.431 | 1.447 |
| 18 | 95.525 | 94.913 | 2.55 | 2.2 | 1.218 | 1.354 |

[a]Before accelerated aging.
[b]After accelerated aging.

The webs produced according to the methods of the present invention show excellent response to the accelerated aging test. The filtering efficiency and the filtration quality are maintained at consistent levels, at least as good as the prior art.

EXAMPLE V

Biased Charging Drum Charging: Low basis weight (1 oz/yd$^2$) and high basis weight (3 oz/yd$^2$) polypropylene webs were charged with an apparatus according to FIG. 1 (Technique I). In all cases, the charging bar was biased to apply a positive charge while the charging drum was biased to apply a negative charge according to Table IX. The height of the charging bar above the conductive charging drum was in each case 1.0 inches. Table X shows conditions and charging results for the webs charged on an apparatus according to FIG. 1 (Technique I), and Table XI lists the measured surface charge potential for those webs.

TABLE IX

| | Charging Voltages (kVDC) | | | |
|---|---|---|---|---|
| No.[a] | Bar 1 | Bar 2 | Drum 1 | Drum 2 |
| 21 | +10.5 | +10.5 | −10.5 | −10.5 |
| 22 | +16 | +16 | −4 | −4 |
| 23 | +15 | +15 | −4 | −4 |
| 24 | +9 | +9 | −9 | −9 |

[a]21 and 22 are 3 oz/yd$^2$ polypropylene; 23 and 24 are 1 oz/yd$^2$ polypropylene.

TABLE X

| No.[a] | Filt. Eff.[b] | Filt. Eff.[c] | $\Delta p$ | $q_f$ |
|---|---|---|---|---|
| 21 | 71.65 | 97.308 | 6.45 | 0.560 |
| 22 | 71.65 | 98.607 | 5.2 | 0.822 |
| 23 | 41.55 | 99.191 | 2.5 | 1.927 |
| 24 | 41.55 | 98.844 | 2.5 | 1.984 |

[a]Same as in Table IX.
[b]Before charging.
[c]After charging.

TABLE XI

| | Surface Charge Potential | | | |
| | Screen Side | | Face Side | |
| No.[a] | Arith. Avg. | Abs. Avg. | Arith. Avg. | Abs. Avg. |
| --- | --- | --- | --- | --- |
| 21 | +100 | 356 | −238 | 284 |
| 22 | −76 | 287 | −315 | 351 |
| 23 | +540 | 540 | −592 | 592 |
| 24 | +527 | 527 | −505 | 505 |

[a]Same in Table IX.

As is seen in Tables IX–XI, webs are produced using biased charging drums. Contrary to the expectations of the prior art, the webs exhibit high values of filtering efficiency and filtration quality.

EXAMPLE VI

Charging of Anionically Grafted Polyolefin: A polyolefin web was prepared by mixing an original polypropylene with a polypropylene that had been grafted with 6 wt. % acrylic acid. The polyolefin mixture was charged by a variety of methods. Table XII shows conditions and charging results for the webs.

TABLE XII

| No.[a] | Chg. Method[b] | Filt. Eff.[c] | Filt. Eff.[d] | Δp | $q_f$ |
| --- | --- | --- | --- | --- | --- |
| 25 | A | 45.70 | 98.708 | 2.2 | 1.977 |
| 26 | B | 38.25 | 99.103 | 2.25 | 2.095 |
| 27 | B | 45.70 | 98.695 | 2.05 | 2.117 |
| 28 | C | 45.70 | 97.33 | 2.6 | 1.39 |
| 29 | C | 45.70 | 96.37 | 2.5 | 1.33 |

[a]25, 27, 28, and 29 are 10 wt. % grafted polypropylene in 90 wt. % ungrafted polypropylene; 26 is 5 wt. % grafted polypropylene in 90 wt. % ungrafted polypropylene.
[b]A is the contact cloth method of U.S. Pat. No. 4,375,718 to Wadsworth, et al.; B is the method using the apparatus of FIG. 1; C is the method using the apparatus of FIG. 4.
[c]Before charging.
[d]After charging.

Table XII shows that the web is efficiently charged to acceptable levels so as to produce a web with substantially good filtering efficiency and filtration quality. Upon accelerated aging testing, sample numbers 25 and 28 also showed good retention of the charge. Sample number 25 had a filtering efficiency of 92.390 and Sample number 28 had a filtering efficiency of 87.64. As was discussed above, these results are unexpected in light of the nature of the mixture. The presence of anions grafted to the polyolefin would lead a person having skill in the art to predict that the charge would bleed off the web with time.

EXAMPLE VII

Charging at Elevated Temperature: Table XIII lists the conditions and charging results for a variety of webs charged on an apparatus according to FIG. 1 (Technique I) and an apparatus according to FIG. 4 (Technique II), at ambient and elevated (150° F.) temperatures. Such charging was performed on both polypropylene and polyester webs.

TABLE XIII

| | | | | Charge Potential (V) | | | | | |
| | | | | Outside | | Inside | | NaCl | |
| Sample[a] | Technique | Fabric Temp.[d] When Charged | Control Filt. Eff. | Arith. Avg. | Absol. Avg. | Arith. Avg. | Absol. Avg. | Filt. Eff.[e] | Δp (mm water) |
| --- | --- | --- | --- | --- | --- | --- | --- | --- | --- |
| 0.75 oz. PP | I[b] | 150° F. | 28.43 | 143 | 21.7 | −437 | 437 | 94.8 | 1.7 |
| | I | Ambient | 28.43 | 154 | 210 | −422 | 422 | 94.3 | 1.7 |
| | II[c] | 150° F. | 27.9 | 83 | 177 | −78 | 282 | 90.8 | 1.6 |
| | II | Ambient | 27.9 | 169 | 170 | −130 | 220 | 92.7 | 1.65 |
| 3 oz. PP | I | 150° F. | 68.2 | 162 | 413 | −524 | 659 | 95.99 | 6.2 |
| | I | Ambient | 68.2 | 154 | 355 | −1103 | 1120 | 98.7 | 6.3 |
| | II | 150° F. | 68.2 | 625 | 898 | 197 | 482 | 99.593 | 6.2 |
| | II | Ambient | 68.2 | 565 | 873 | −1352 | 1367 | 99.859 | 6.4 |
| 1 oz. PET | I | 150° F. | 11.6 | 6 | 48 | −105 | 116 | 32.7 | 0.5 |
| | I | Ambient | 11.6 | −128 | 233 | −520 | 526 | 52.5 | 0.5 |
| | II | 150° F. | 11.6 | −225 | 229 | −278 | 297 | 45.2 | 0.6 |
| | II | Ambient | 11.6 | 280 | 295 | −132 | 161 | 52.5 | 0.6 |

[a]Melt blown (MB) webs.
[b]Wire height above steel roll of 1 inch, 18–20 kV positive potential on wire and bias of 1–2 kv/negative potential on both rolls.
[c]Wire-in-shell configuration with 5-inch diameter aluminum shells, +24 kV potential on the wire, −24 kV on each shell and 5 wooden dowels, 1-inch diameter.
[d]MB webs were laced around the collector cylinder of a 20-inch horizontal MB line and hot air was blown onto the webs which were heated such that they were all at 150° F. upon entering the charging unit.
[e]Challenged by aerosol of 0.1 micron sodium chloride particles travelling at 5 cm/s.

Table XIII shows that the process of charging a web with either the apparatus of FIG. 1 (Technique I) or the apparatus of FIG. 4 (Technique II) produces webs with good filtering efficiencies and excellent filtration qualities, and that these results are not adversely affected by elevated temperature.

EXAMPLE VIII

Charging at High Humidity: Table XIV lists the conditions and charging results for a variety of webs charged on an apparatus according to FIG. 1 (Technique I) and an apparatus according to FIG. 4 (Technique II), at typical (40%) and high (95%) humidities. Such charging was performed on polypropylene webs of varying weight and fiber diameter.

TABLE XIV

| Samples | | Typical[a] | | Tech. I[b] | | Tech. II[c] | |
|---|---|---|---|---|---|---|---|
| Weight | Fiber Dia.(μm) | Filt. Eff. | Δp (mm water) | Filt. Eff. | Δp (mm water) | Filt. Eff. | Δp (mm water) |
| 33 g/m$^2$ | ϕ = 2.14 μm | 53.9 | 2.4 | 97.3 | 2.4 | 95.0 | 2.7 |
| 52 g/m$^2$ | ϕ = 2.12 μm | 70.0 | 3.5 | 99.10 | 3.8 | 99.45 | 4.1 |
| 101 g/m$^2$ | ϕ = 2.20 μm | 88.9 | 6.0 | 99.22 | 7.5 | 99.999 | 7.0 |
| 13.6 g/m$^2$ | ϕ = 2.05 μm | 27.5 | 0.95 | 85.1 | 1.2 | 63.2 | 1.1 |
| 33 g/m$^2$ | ϕ = 5.50 μm | 14.5 | 0.55 | 60.2 | 0.6 | 59.6 | 0.8 |

[a]Typcial values at 70° F. and at 40% humidity.
[b]Wire height above steel roll of 1-inch, 18–20 kV positive potential on wire and bias of 1–2 kV negative potential on both rolls; at 95% humidity and 70° F.
[c]Wire-in-shell configuration using only one aluminum shell with a diameter of 5-inches and with three 1 ⅛-inch diameter wood dowels; at 95% humidity and 70° F.

Table XIV shows that the process of charging a web with either the apparatus of FIG. 1 (Technique I) or the apparatus of FIG. 4 (Technique II) produces webs with good filtering efficiencies and excellent filtration qualities. For relatively thin webs, Technique I appears to be especially satifactory and is not adversely affected by elevated humidity. For thicker webs, the filtration efficiency is remarkably increased using Technique II. This offers greater flexibility depending on the nature of the web.

EXAMPLE IX

Cold Charging of Laminated Fabrics: Table XV lists the conditions and charging results for a variety of webs charged on an apparatus according to FIG. 1 (Technique I) and an apparatus according to FIG. 4 (Technique II). Laminated fabrics (meltblown and spunbond layers) were charged according to the conditions listed, in different orientations (i.e., meltblown layer facing up and meltblown layer facing down). The specified orientation (for the meltblown layer) represents the orientation which the identified layer assumed when entering the apparatus (an apparatus according to FIG. 6 suitably connected to assume a configuration according to FIG. 1 or a configuration according to FIG. 4) from the right side (as viewed in FIG. 6).

TABLE XV

| | | Control | | Charged | | | | | |
|---|---|---|---|---|---|---|---|---|---|
| Wt. | Dist.[a] | Eff. | Δp | Tech. | MB | V | I | Eff. | Δp |
| 20 | 5.1 | 31.0 | 1.5 | I | up | 35/–1 | 2.0 | 94.5 | 1.6 |
| 20 | 8.9 | 31.0 | 1.5 | II | up | 35/–32 | 1.0 | 89.7 | 1.6 |
| 20 | 8.9 | 31.0 | 1.5 | II | down | 35/–32 | 0.6 | 90.6 | 1.6 |
| 20 | 5.1 | 31.0 | 1.5 | I | down | 40/–1 | 4.0 | 89.2 | 1.7 |
| 20 | 5.1 | 40.8 | 2.5 | I | up | 35/–1 | 2.6 | 97.7 | 2.9 |
| 20 | 8.9 | 40.8 | 2.5 | II | up | 35/–32 | 0.6 | 94.5 | 2.8 |
| 20 | 8.9 | 40.8 | 2.5 | II | down | 35/–32 | 0.6 | 93.1 | 2.6 |
| 20 | 5.1 | 40.8 | 2.5 | I | down | 45/–1 | 6.0 | 92.7 | 2.6 |
| 25 | 5.1 | 34.3 | 1.7 | I | up | 40/–1 | 5.0 | 97.5 | 1.8 |
| 25 | 8.9 | 34.3 | 1.7 | II | up | 35/–31 | 0.6 | 94.5 | 2.1 |
| 25 | 8.9 | 34.3 | 1.7 | II | down | 35/–32 | 0.6 | 91.5 | 2.0 |
| 25 | 5.1 | 34.3 | 1.7 | I | down | 40/–1 | 5.0 | 91.1 | 1.9 |
| 25 | 5.1 | 45.5 | 2.9 | I | up | 40/–1 | 5.0 | 98.1 | 3.0 |
| 25 | 8.9 | 45.5 | 2.9 | II | up | 35/–32 | 0.6 | 95.3 | 2.8 |
| 25 | 8.9 | 45.5 | 2.9 | II | down | 35/–32 | 0.6 | 94.0 | 3.0 |
| 25 | 5.1 | 45.5 | 2.9 | I | down | 40/–1 | 5.0 | 94.9 | 3.0 |
| 30 | 5.1 | 37.9 | 2.0 | I | up | 40/–1 | 5.5 | 95.8 | 2.2 |
| 30 | 8.9 | 37.9 | 2.0 | II | up | 35/–32 | 0.6 | 96.7 | 2.4 |
| 30 | 8.9 | 37.9 | 2.0 | II | down | 35/–30 | 0.5 | 96.7 | 2.4 |
| 30 | 5.1 | 37.9 | 2.0 | I | down | 40/–1 | 5.5 | 93.9 | 2.3 |
| 30 | 5.1 | 49.9 | 3.5 | I | up | 42/–1 | 5.5 | 98.7 | 3.9 |
| 30 | 8.9 | 49.9 | 3.5 | II | up | 34/–34 | 0.6 | 98.7 | 4.0 |
| 30 | 8.9 | 54.4 | 3.4 | II | up | 33/–33 | 0.6 | 98.7 | 3.8 |
| 30 | 5.1 | 54.4 | 3.4 | I | up | 40/–1 | 5.6 | 98.5 | 3.8 |
| 40 | 8.9 | 46.6 | 2.6 | II | up | 35/–32 | 0.6 | 98.5 | 3.0 |
| 40 | 5.1 | 46.6 | 2.6 | I | up | 40/–1 | 6.0 | 97.2 | 3.0 |
| 40 | 5.1 | 46.6 | 2.6 | I | down | 40/–1 | 6.0 | 95.6 | 3.0 |
| 40 | 8.9 | 46.6 | 2.6 | II | down | 32/–30 | 0.4 | 98.7 | 2.7 |
| 80 | 8.9 | 66.3 | 4.7 | II | up | 30/–28 | 0.7 | 99.50 | 5.4 |
| 80 | 8.9 | 66.3 | 4.7 | II | down | 30/–28 | 1.7 | 99.89 | 5.3 |

[a]Distance (in cm.) between the charging wire or bar and the corresponding drum or shell.

Table XV shows that when webs are charged with an apparatus according to FIG. 1 (Technique I), the orientation of the meltblown layer (of the laminated web) will have an effect upon the filtering efficiency which is achieved. It has been found that when the meltblown layer faces upwardly when traversing the second of the two charging drums, a higher filtering efficiency is achieved. Without wishing to be bound by such explanation, it is believed that this results from a need to ensure contact between the meltblown layer of the laminated web and the surface of the second drum to provide a greater permanence to the charge. When webs are charged with an apparatus according to FIG. 4 (Technique II), the orientation of the meltblown layer relative to the charging apparatus appears to have no appreciable effect upon the filtering efficiency which is achieved.

Although this specification discloses particular embodiments of the invention, these examples merely describe illustrations of the invention. Those skilled in the art may suggest numerous rearrangements, modifications and substitutions of parts of the invention without departing from the spirit of the invention. In particular, it will occur to a skilled practitioner in the art that a similar type of charging may be effected by alternately varying the polarity of the charging bars and wires and the charging rollers and shells rather than varying the side of the web that is exposed to them. Also suggested are numerous rearrangements, modifications and substitutions of materials forming the webs without departing from the spirit of the invention. In particular, it will occur to a skilled practitioner in the art that any of a variety webs formed of any of a variety of materials may be subjected to a similar type of charging as that previously described, including both single and multilayered or laminated webs. For example, deep-grooved 4DG fibers (Eastman Chemical Company) have been treated according to the technique represented by FIG. 4 (Technique II). It was found that the resulting filtration efficiency increased from 20% to 72%. The 4DG fibers have a great deal more surface area which can accept electrostatic charging, leading to such improvements. It is also possible to use lighter weight meltblown nonwoven webs and/or to make the meltblown fibers courser, and to still obtain high filtration efficiencies and minimal pressure losses making use of the improvements of the present invention.

Also capable of variation is the configuration of the apparatus used for cold charging of the webs. For example, the apparatus according to FIG. 1 (Technique I) is ordinarily comprised of a wire in conjunction with a steel drum. However, different wire and drum materials can be used provided they are appropriately conductive. It is even possible to replace the wire with a series of pins, or a charging bar, if desired. In such case, the series of pins are radially oriented relative to the drum, and are longitudinally aligned with one another to form a single row of pins extending longitudinally along the corresponding drum, serving a function equivalent to the single wire replaced by the series of pins.

The apparatus according to FIG. 4 (Technique II) is also capable of variation. For example, the apparatus according to FIG. 4 (Technique II) is ordinarily comprised of a bar in conjunction with an aluminum shell. As with the apparatus according to FIG. 1 (Technique I), the bar can be replaced with a series of pins which are radially oriented relative to the shell and longitudinally aligned with one another to form a single row extending longitudinally along the corresponding shell. Alternatively, a plurality of rows of pins may be used, forming a radial pattern extending from the center of the shell to its inner surface. Different bar and shell materials can be used provided they are appropriately conductive. For example, the shell can be formed of a variety of conductive materials including metals, conductive plastics and ceramics provided with a suitable conductive outer coating (forming the inner surface of the shell).

Also capable of variation are the rollers used to support the web as it progresses through the overlying shell (e.g., the rollers 122, 136 in FIG. 4, as well as the rollers 120, 128 and 134, 142 if they are insulative rollers, as well as the corresponding rollers of the apparatus of FIG. 6). As indicated previously, these rollers can be formed of wood, plastic or a ceramic. Such materials may be used in forming the rollers either as unitary structures, or as composites.

Figure 7A:
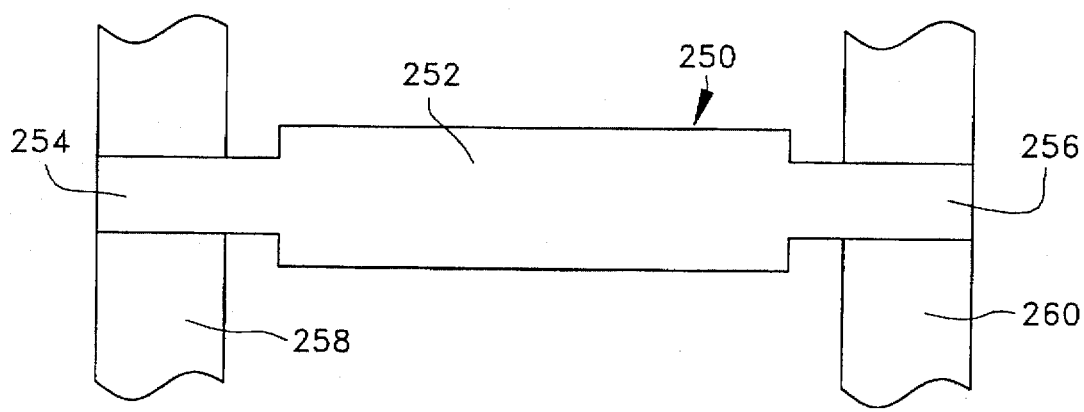
FIG. 7a is an elevational view of a unitary roller for supporting a transported web.

FIG. 7a shows a unitary roller 250 which includes a body 252 having opposing ends 254, 256 of a reduced diameter. The ends 254, 256 are appropriately journalled for rotation within and between the end plates 258, 260 which comprise the charging apparatus. Unitary rollers are most useful when formed of relatively rigid materials, such as some plastics, ceramics, and wood dowels used in supporting fabrics having a width of two meters or less.

Figure 7B:
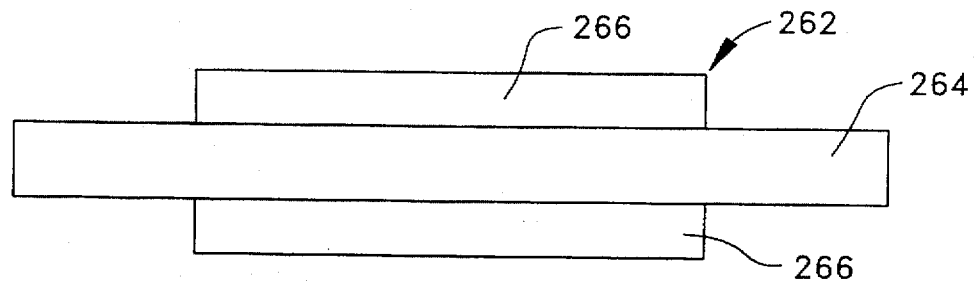
FIG. 7b is an elevational view of an alternative embodiment roller for supporting a transported web.

For less rigid materials (including some plastics and wood), and referring to FIG. 7b of the drawings, the rollers 262 are preferably provided with a metal shaft 264 running through the center to provide additional structural integrity to the roller body 266. The use of a metal shaft is further recommended as the length of the rollers increases beyond one or two meters. In any event, a more stable roller results, which in turn minimizes bending or distortion of the roller when placed in service.

Figure 7C:
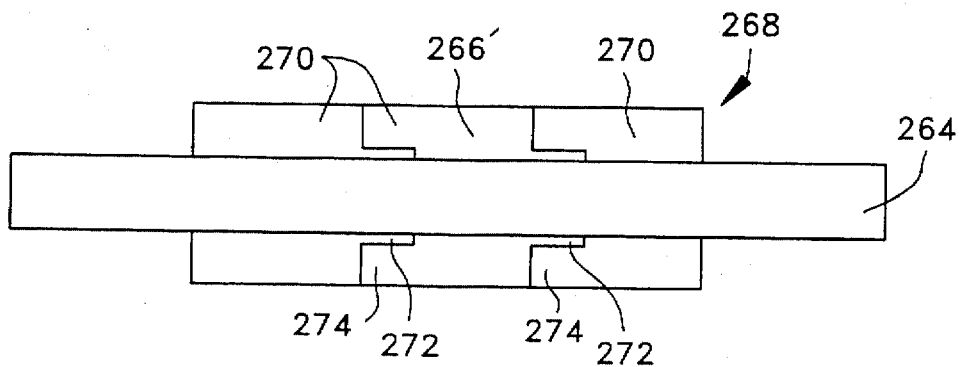
FIG. 7c is an elevational view of a further alternative embodiment roller for supporting a transported web.

FIG. 7c of the drawings shows yet another alternative roller 268 useful in supporting transported webs. In this embodiment, the unitary (outer) roller body 266 is replaced with a roller body 266' formed of a series of segmented sections 270. This has been found to be particularly useful for rollers formed of wood, although plastic rollers would also benefit from such construction. The segmented sections 270 can, and preferably include male elements 272 and female elements 274 which interact to facilitate assembly of the segmented sections 270 on the central shaft 264. The central (metal) shaft 264 also allows the resulting rollers to rotate with less vibration and friction. The segmented sections 270 preferably have a length on the order of 6 to 10 inches. The male/female elements 272,274 are useful in minimizing potential effects that the jointed segments may have on the electric field during charging of the webs. Glues which serve as good insulators may be used to improve the jointed connections, if desired. The segmented sections 270 may also be machined (e.g., on a lathe) following their assembly to form a more uniform roller, to minimize any effects of the joints on the webs to be transported through the apparatus.

Table XVI lists the conditions and charging results for a variety of webs charged on an apparatus according to FIG. 4 (Technique II) using various different types of rollers including rollers formed of wood, plastics and ceramics, as well as segmented wood rollers.

TABLE XVI

| Basis Wt.[a] (g/m²) | Roller[b,c] Type | Current (mA) | Voltage (V) | Filt. Eff. (%) | ΔP (mm H₂O) |
| --- | --- | --- | --- | --- | --- |
| 30 | nylon | 1.0 | +40/−40 | 95.82 | 1.45 |
| 60 | nylon | 0.2 | +36/−36 | 96.91 | 3.4 |
| 80[d] | nylon | 0.6 | +35/−33 | 99.763 | 4.6 |
| 80[d] | joint wood[e] | 0.4 | +30/−30 | 99.868 | 4.7 |
| 60 | joint wood[e] | 0.2 | +35/−33 | 98.48 | 3.7 |
| 30 | joint wood[e] | 0.1 | +31/−28 | 92.10 | 1.5 |
| 30 | plexiglass | 0.4 | +40/−38 | 95.97 | 1.6 |
| 60 | plexiglass | 0.2 | +35/−35 | 98.79 | 3.5 |
| 80[d] | plexiglass | 0.6 | +35/−30 | 99.907 | 5.3 |
| 80[d] | wood | 0.8 | +34/−33 | 99.950 | 5.7 |
| 60 | wood | 0.6 | +35/−32 | 99.454 | 3.3 |
| 30 | wood | 0.5 | +38/−38 | 89.84 | 1.5 |
| 30 | ceramic | 0.4 | +30/−18 | 94.81 | 1.6 |
| 60 | ceramic | 0.6 | +30/−25 | 98.78 | 2.7 |
| 3.5 oz/yd² | ceramic | 0.4 | +35/−33 | 99.807 | 3.8 |
| 3.5 oz/yd² | wood* | 1.6 | +43/−43 | 99.971 | 5.4 |
| 60 | wood* | 0.6 | +41/−41 | 98.41 | 2.8 |
| 30 | wood* | 0.5 | +45/−45 | 96.26 | 1.3 |
| 80[d] | wood* | 1.2 | +41/−41 | 99.961 | 5.2 |

TABLE XVI-continued

| Basis Wt.[a] (g/m²) | Roller[b,c] Type | Current (mA) | Voltage (V) | Filt. Eff. (%) | ΔP (mm H₂O) |
|---|---|---|---|---|---|
| 30 | control | | | 35.4 | 1.4 |
| 60 | control | | | 59.3 | 3.0 |
| 3.5 oz/yd² | control | | | 72.5 | 4.5 |
| 80[d] | control | | | 66.3 | 4.7 |

[a]Basis weight of meltblown polypropylene.
[b]Solid rolls of one material utilized unless otherwise specified.
[c]Metal shell of 8-inch diameter used with all samples except those marked with an asterisk, which were used with a metal shell of 10-inch diameter.
[d]Laminated spunbond (SB)/meltblown (MB) web (weight of SB/PP in the laminate was 20 g/m²).
[e]Metal shaft through wood dowel with straight joints every 7-inches.

Table XVI shows that charging a web with the apparatus of FIG. 4 (Technique II) produces webs with good filtering efficiencies and excellent filtration qualities irrespective of the composition of the rollers used to support the web as it is transported through the apparatus.

Also capable of variation are the charging shells used in an apparatus for charging a web according to the previously described Technique II (e.g., the shells 126, 140 of FIG. 4 and the shells 224, 244 of FIG. 6). For example, this can include variation in the diameter of the shell. In this regard, shells having a diameter of 5, 7, 8 and 10 inches have been employed, and have been found to provide satisfactory results. Any of the above-listed roller configurations should work well with either an 8 inch diameter shell or a 10 inch diameter shell since, in operation, it has generally been found that 10 inch diameter shells work very well when compared to 8 inch diameter shells (this, in conjunction with solid wood rollers on a test apparatus).

Figure 8A:
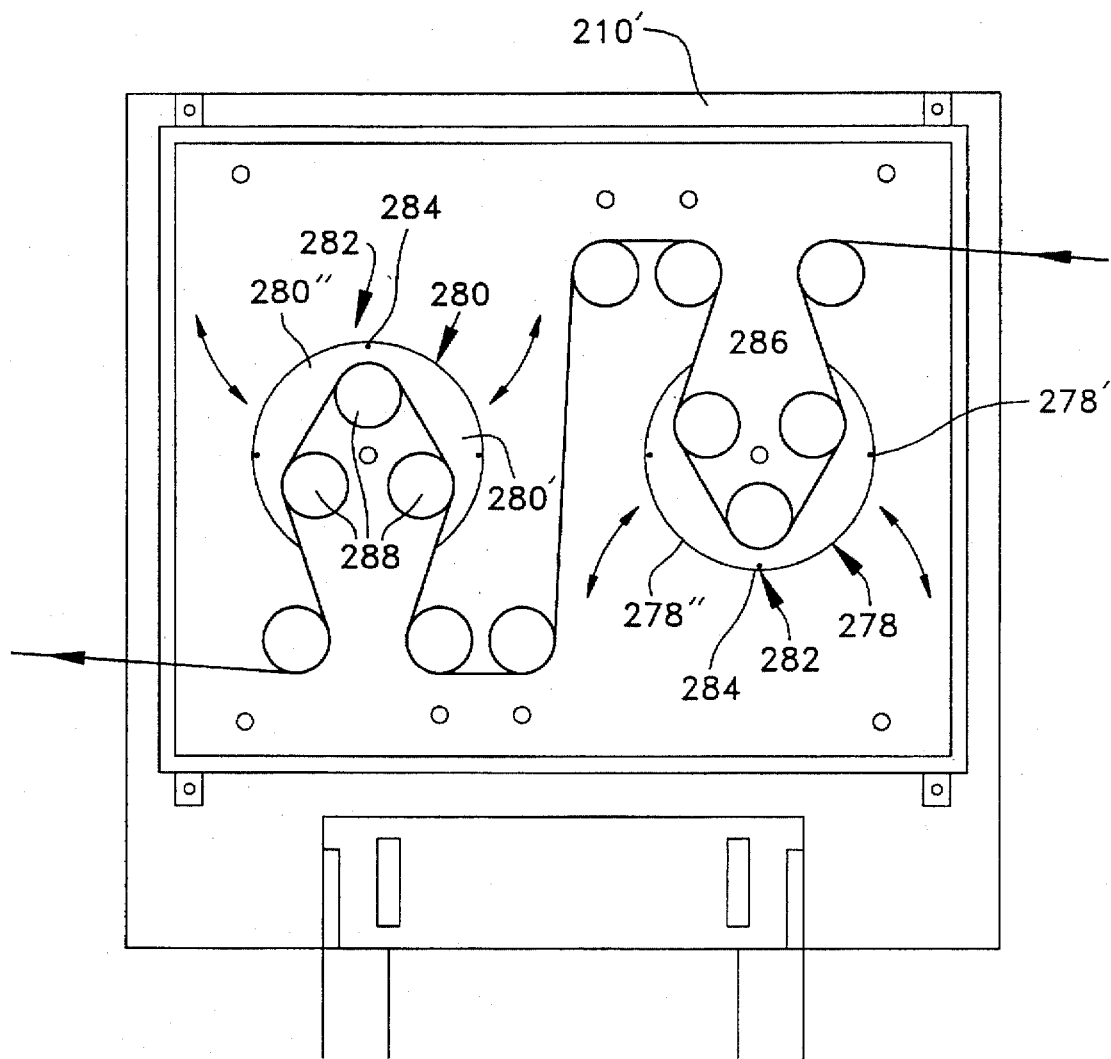
FIG. 8a is a schematic sectional view of an apparatus similar to that of FIG. 6, with split collector shells hinged for access to the web.

This can also include variations in the metal shell to facilitate installation (so-called "lacing up") of the webs in the charging apparatus. For example, FIG. 8a shows an apparatus 210' which substantially corresponds to the apparatus 210 of FIG. 6. However, the apparatus 210' of FIG. 8a incorporates shells 278, 280 which are longitudinally separated into two parts along a seam 282. The resulting shell sections 278', 278" and 280', 280" are preferably equivalent in size and shape, and are connected together by a seamless hinge 284. This allows the resulting shell sections to be swung open and away from the centrally disposed rollers 286, 288 of the apparatus 210', allowing free access for purposes of lacing up the web. Any of a variety of known seamless hinges can be used for such purposes.

Figure 8B:
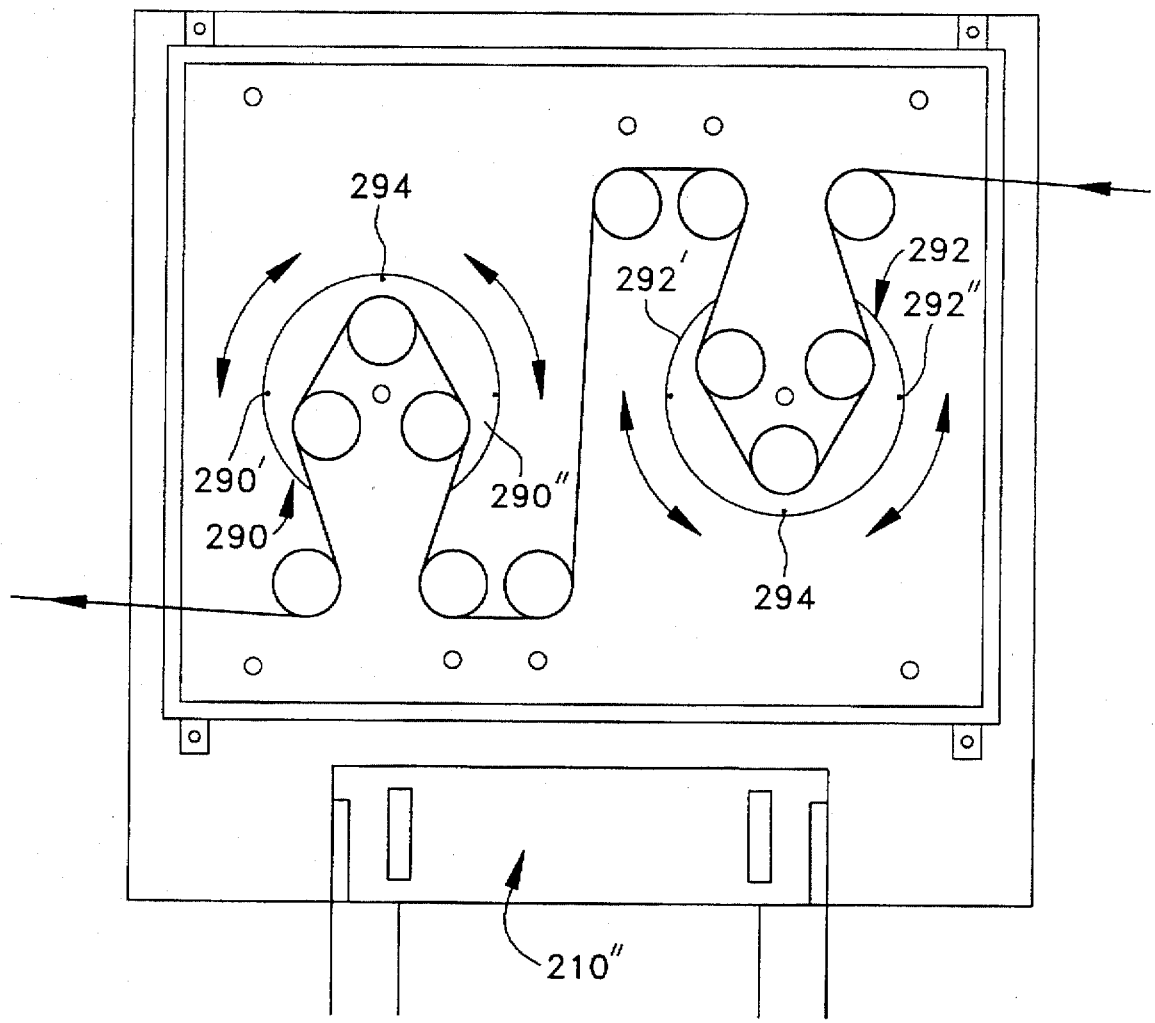
FIG. 8b is a schematic sectional view of an apparatus similar to FIG. 6, with split collector shells joined to slide relative to one another for access to the web.

FIG. 8b again shows an apparatus 210" which substantially corresponds to the apparatus 210 of FIG. 6, and which again incorporates shells 290, 292 formed as shell sections 290', 290" and 292', 292". However, in this embodiment, the shell sections are connected by tracks 294 which permit the shell sections to slide relative to one another, allowing free access for purposes of lacing up the web. Any of a variety of known tracks can be used for such purposes.

It is also possible to provide a unitary shell which is slidingly received between the opposing end plates of the apparatus, so that lacing up of the web can be facilitated by sliding the shell laterally outwardly from the apparatus (from one of its ends). However, this is presently considered less preferred due to the cantilevered length of the resulting shell, which can at times be significant.

Figure 9:
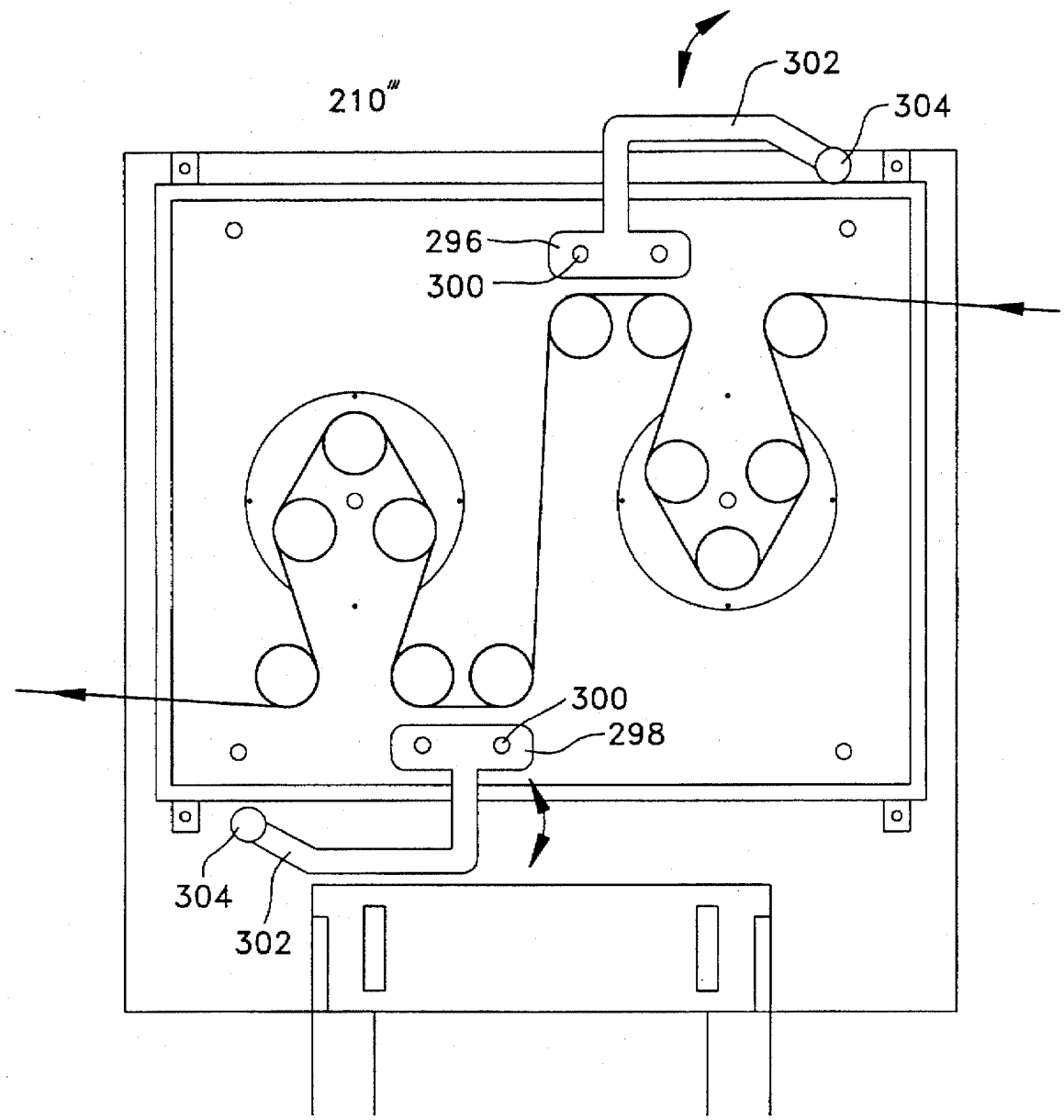
FIG. 9 is a schematic sectional view of an apparatus similar to FIG. 6, with the charging wires mounted to a fixture which can be pivoted for access to the web.

Similar considerations concerning the lacing up of webs can occur in conjunction with an apparatus for charging a web according to the previously described Technique I (e.g., the apparatus of FIG. 1 and the charging bars 230, 236 and drums 228, 234 of FIG. 6), particularly when considering the relatively fragile wires which may form part of such an apparatus. FIG. 9 shows an apparatus 210'" which substantially corresponds to the apparatus 210 of FIG. 6, and which incorporates pivotable fixtures 296, 298 for facilitating lacing up of the webs in the charging apparatus 210'". In this configuration, the charging wires 300 are received by the fixtures 296, 298 and the fixtures are each in turn associated with an arm 302 which is pivotally connected to the frame 304 of the apparatus 210'". Lacing up of the web is facilitated by pivoting the fixtures 296, 298 from their normal position adjacent to the corresponding drum, to a retracted position which allows free access to the drum.

It has also been found that any of a variety of power supplies may be used to bias the charging wires/bars and the collecting drums/rollers in accordance with the present invention. For example, both Glassman and SIMCO power supplies have been used for such purposes while achieving satisfactory results. Other power supplies may be selected and used if desired. Depending upon the power supply which is selected for use, potentials reaching 30 kV, 50 kV, and even up to 100 kV or more, can be successfully employed in accordance with the present invention.

It has also been found that the charging wire, the charging bar, the outer surface of the drum and/or the inner surface of the shell can be coated with a thin insulating layer of a plastic (e.g., a synthetic), if desired. This allows a more intense electrical field to be developed, yet without arcing. Such a film may be on the order of a few mils (e.g., 5–80 mils) in thickness, or other thicknesses appropriate to a particular configuration.

The temperature range over which a web or film can be processed in accordance with the present invention is quite broad. However, since it is generally desired to maintain the physical integrity of the web or film (including dimension and/or porosity), it is best not to exceed the temperature at which the material will begin to shrink. Thus, the maximum temperature at or in the vicinity of the charging apparatus will preferably range from about 250° F. to about 200° F. The temperature of the environment in which the foregoing operations may be carried out can vary over a broad range from about 35° F. to about 120° F. (this tends to be governed more by the physiological tolerances of people in the vicinity of the apparatus to ambient conditions, more so than to any limitations on the charging process).

The appended claims set forth various novel and useful features of the invention.

The above examples and description fully disclose the present invention including preferred embodiments thereof. The invention, however, is not limited to the precise embodiments described herein but includes all modifications encompassed with the scope and spirit of the following claims.

We claim:

1. An apparatus for electrostatically charging a web or film, comprising:

means for generating a dispersed non-arcing electric field between an electrode means having an electrically conductive curved surface and a single conductive element spaced from the curved surface; and means for passing the web or film between the electrode means and the conductive element, for subjecting the web to the dispersed non-arcing electric field between the curved surface and the conductive element.

2. The apparatus of claim 1 wherein the electrode means is a conductive drum and the curved surface is an outer surface of the drum, and wherein the web or film is caused to contact the outer surface of the drum as the web or film passes through the electric field between the drum and the conductive element.

3. The apparatus of claim 2 wherein the conductive element is a charging wire or bar.

4. The apparatus of claim 3 which further includes means for generating at least one subsequent dispersed non-arcing electric field between a subsequent conductive drum having a curved surface, and a subsequent charging wire or bar associated with the subsequent conductive drum.

5. The apparatus of claim 4 which further includes means for exposing a side of the web or film to a first polarity charge upon passage between the drum and the charging wire, and to a second, opposite polarity charge upon passage between the subsequent drum and the subsequent charging wire.

6. The apparatus of claim 3 wherein the drum has a curved surface which is either at ground or is biased at a first potential, and the charging wire is biased at a second potential of opposite polarity.

7. The apparatus of claim 3 wherein the drum has a curved surface which is biased at a potential, and the charging wire is grounded.

8. The apparatus of claim 3 wherein the electric field is generated between about 1 kVDC/cm and about 16 kVDC/cm.

9. The apparatus of claim 8 wherein the electric field is generated between about 4 kVDC/cm and about 13 kVDC/cm.

10. The apparatus of claim 9 wherein the electric field is generated between about 7 kVDC/cm and about 12 kVDC/cm.

11. The apparatus of claim 3 wherein the drum is rotatable.

12. The apparatus of claim 3 wherein the surface of the drum is metal.

13. The apparatus of claim 12 wherein the surface of the drum is steel or aluminum.

14. The apparatus of claim 12 wherein the charging wire is spaced from and extends longitudinally along the drum.

15. The apparatus of claim 14 wherein the charging wire is movably positioned relative to the drum.

16. The apparatus of claim 15 which further includes a pair of fixtures for receiving opposing ends of the charging wire, and a pair of arms receiving the fixtures and pivotally associated with the apparatus.

17. The apparatus of claim 1 wherein the electrode means is a conductive shell and the curved surface is an inner surface of the shell, and wherein the web or film is spaced from the curved surface and the shell as the web or film passes through the electric field between the shell and the conductive element.

18. The apparatus of claim 17 wherein the conductive element is a charging wire or bar.

19. The apparatus of claim 18 which further includes means for generating at least one subsequent dispersed non-arcing electric field between a subsequent conductive shell having a curved surface, and a subsequent charging bar associated with the subsequent conductive shell.

20. The apparatus of claim 19 which further includes means for exposing a side of the web or film to a first polarity charge upon passage between the shell and the charging bar, and to a second, opposite polarity charge upon passage between the subsequent shell and the subsequent charging bar.

21. The apparatus of claim 18 wherein the shell has a curved surface which is biased at a first potential, and the charging bar is biased at a second potential of opposite polarity.

22. The apparatus of claim 18 wherein the shell has a curved surface which is biased at a potential, and the charging bar is grounded.

23. The apparatus of claim 18 wherein the electric field is generated between about 1 kVDC/cm and about 16 kVDC/cm.

24. The apparatus of claim 23 wherein the electric field is generated between about 4 kVDC/cm and about 13 kVDC/cm.

25. The apparatus of claim 24 wherein the electric field is generated between about 7 kVDC/cm and about 12 kVDC/cm.

26. The apparatus of claim 18 wherein the drum is rotatable.

27. The apparatus of claim 18 wherein the inner surface of the shell is metal.

28. The apparatus of claim 27 wherein the inner surface of the shell is aluminum.

29. The apparatus of claim 27 wherein the charging bar is spaced from and extends longitudinally along the shell.

30. The apparatus of claim 29 wherein the conductive shell has an arc-shaped cross-section, and is comprised of shell sections joined along a common seam.

31. The apparatus of claim 30 which further includes a seamless hinge connecting the shell sections along the common seam.

32. The apparatus of claim 30 which further includes tracks for engaging portions of the shell sections for permitting sliding movement of the shell sections relative to one another.

33. The apparatus of claim 18 which further includes a plurality of insulating rollers positioned between the conductive shell and the charging bar, for supporting the web or film passing through the electric field.

34. The apparatus of claim 33 wherein the insulating rollers are formed of wood.

35. The apparatus of claim 34 which further includes a rigid shaft extending longitudinally along, and through the centers of the rollers, for providing the rollers with increased rigidity.

36. The apparatus of claim 35 wherein the rollers are comprised of a plurality of adjoining segments received by the shaft.

37. The apparatus of claim 36 wherein the segments include male and female interlocking structures for mated engagement with one another.

38. The apparatus of claim 33 wherein the insulating rollers are formed of a plastic.

39. The apparatus of claim 38 wherein the rollers are unitary structures including end portions for journaled rotation within frame portions of the apparatus.

40. The apparatus of claim 38 which further includes a rigid shaft extending longitudinally along, and through the centers of the rollers, for providing the rollers with increased rigidity.

41. The apparatus of claim 40 wherein the rollers are comprised of a plurality of adjoining segments received by the shaft.

42. The apparatus of claim 41 wherein the segments include male and female interlocking structures for mated engagement with one another.

43. The apparatus of claim 33 wherein the insulating rollers are formed of a ceramic.

44. The apparatus of claim 43 wherein the rollers are unitary structures including end portions for journaled rotation within frame portions of the apparatus.

45. An apparatus for electrostatically charging a web or film, comprising:

means for generating plural dispersed non-arcing electric fields between plural electrode means, each having an electrically conductive curved surface, and a corresponding number of single conductive elements spaced from the curved surface of the corresponding electrode means; and means for passing the web or film between the plural electrode means and the corresponding conductive elements, for subjecting the web or film to the plural dispersed non-arcing electric fields between the plural electrode means and the corresponding conductive elements, including means for exposing a first side of the web or film to a first polarity charge upon passage between a first electrode means and a first corresponding conductive element, and to a second, opposite polarity charge upon passage between a second electrode means and a second corresponding conductive element, and means for exposing a second side of the web or film opposite the first side to the second polarity charge upon passage between the first electrode means and the first corresponding conductive element, and to the first polarity charge upon passage between the second electrode means and the second corresponding conductive element.

46. The apparatus of claim 45 wherein the first electrode means is a conductive drum, wherein the curved surface is an outer surface of the drum, and wherein the web or film is caused to contact the outer surface of the drum as the web or film passes through the electric field between the drum and the first conductive element.

47. The apparatus of claim 46 wherein the first conductive element is a charging wire.

48. The apparatus of claim 47 wherein the second electrode means is a second conductive drum having a curved surface, and wherein the second conductive element is a charging wire associated with the second conductive drum.

49. The apparatus of claim 48 wherein the electric field is generated between about 1 kVDC/cm and about 16 kVDC/cm.

50. The apparatus of claim 49 wherein the electric field is generated between about 4 kVDC/cm and about 13 kVDC/cm.

51. The apparatus of claim 50 wherein the electric field is generated between about 7 kVDC/cm and about 12 kVDC/cm.

52. The apparatus of claim 48 wherein the surfaces of the drums are metal.

53. The apparatus of claim 52 wherein the surfaces of the drums are steel or aluminum.

54. The apparatus of claim 45 wherein the first electrode means is a conductive shell, wherein the curved surface is an inner surface of the shell, and wherein the web or film is spaced from the shells and the first conductive element as the web or film passes through the electric field between the shell and the first conductive element.

55. The apparatus of claim 54 wherein the first conductive element is a charging bar.

56. The apparatus of claim 55 wherein the second electrode means is a second conductive shell having a curved surface, and wherein the second conductive element is a charging bar associated with the second conductive shell.

57. The apparatus of claim 56 wherein the electric field is generated between about 1 kVDC/cm and about 16 kVDC/cm.

58. The apparatus of claim 57 wherein the electric field is generated between about 4 kVDC/cm and about 13 kVDC/cm.

59. The apparatus of claim 58 wherein the electric field is generated between about 7 kVDC/cm and about 12 kVDC/cm.

60. The apparatus of claim 56 wherein the inner surfaces of the shells are metal.

61. The apparatus of claim 60 wherein the inner surfaces of the shells are aluminum.

62. The apparatus of claim 56 which further includes a plurality of insulating rollers positioned between the conductive shells and the charging bars, for supporting the web or film passing through the electric field.

63. The apparatus of claim 45 wherein the first electrode means includes a conductive shell, wherein the curved surface is an inner surface of the shell, and wherein the web or film is spaced from the shell and the first conductive element as the web or film passes through the electric field between the shell and the first conductive element.

64. The apparatus of claim 63 wherein the first conductive element includes a charging bar.

65. The apparatus of claim 64 wherein the first electrode means further includes a conductive drum, wherein the curved surface is an outer surface of the drum, and wherein the web or film is caused to contact the outer surface of the drum as the web or film passes through the electric field between the drum and the first conductive element.

66. The apparatus of claim 65 wherein the first conductive element further includes a charging wire.

67. The apparatus of claim 66 wherein the second electrode means includes a conductive drum having a curved surface, and wherein the second conductive element includes a charging wire associated with the conductive drum.

68. The apparatus of claim 67 wherein the second electrode means further includes a conductive shell having a curved surface, and wherein the second conductive element includes a charging bar associated with the conductive shell.

69. The apparatus of claim 68 wherein the electric field is generated between about 1 kVDC/cm and about 16 kVDC/cm.

70. The apparatus of claim 69 wherein the electric field is generated between about 4 kVDC/cm and about 13 kVDC/cm.

71. The apparatus of claim 70 wherein the electric field is generated between about 7 kVDC/cm and about 12 kVDC/cm.

72. The apparatus of claim 68 which further includes a plurality of insulating rollers positioned between the conductive shells and the charging bars, for supporting the web or film passing through the shell.

73. A method for electrostatically charging a web or film, comprising the steps of:

generating plural dispersed non-arcing electric fields between plural electrode means, each having an electrically conductive curved surface, and a corresponding number of single conductive elements spaced from the curved surface of the corresponding electrode means;

passing the web or film between the plural electrode means and the corresponding conductive elements, subjecting the web or film to the plural dispersed non-arcing electric fields between the plural electrode means and the corresponding conductive elements;

exposing a first side of the web or film to a first polarity charge upon passage between a first electrode means and a first corresponding conductive element, and to a second, opposite polarity charge upon passage between a second electrode means and a second corresponding conductive element; and exposing a second side of the web or film opposite the first side to the second polarity charge upon passage between the first electrode means and the first corresponding conductive element, and to the first polarity charge upon passage between the second electrode means and the second corresponding conductive element.

74. The method of claim 73 wherein the first electrode means includes a conductive shell, wherein the curved surface is an inner surface of the shell, and which further comprises the step of spacing the web or film from the shell and the first conductive element as the web or film passes through the electric field between the shell and the first conductive element.

75. The method of claim 74 wherein the first conductive element is a charging bar.

76. The method of claim 75 wherein the first electrode means further includes a conductive drum, wherein the curved surface is an outer surface of the drum, and which further comprises the step of placing the web or film in contact with the outer surface of the drum as the web or film passes through the electric field between the drum and the first conductive element.

77. The method of claim 76 wherein the first conductive element further includes a charging wire.

78. The method of claim 77 wherein the second electrode means includes a conductive drum having a curved surface, wherein the second conductive element includes a charging wire associated with the conductive drum, and which further comprises the step of placing the web or film in contact with the outer surface of the drum as the web or film passes through the electric field between drum and the charging wire.

79. The method of claim 78 wherein the second electrode means further includes a conductive shell having a curved surface, wherein the second conductive element includes a charging bar associated with the conductive shell, and which further comprises the step of spacing the web or film from the shell and the charging bar as the web or film passes through the electric field between the shell and the charging bar.

80. The method of claim 79 wherein the electric field is generated between about 1 kVDC/cm and about 16 kVDC/cm.

81. The method of claim 80 wherein the electric field is generated between about 4 kVDC/cm and about 13 kVDC/cm.

82. The method of claim 81 wherein the electric field is generated between about 7 kVDC/cm and about 12 kVDC/cm.

83. The method of claim 79 which further includes a plurality of insulating rollers positioned within the shell and between the conductive shells and the charging bars, and which further comprises the step of supporting the web or film with the insulating rollers while passing through the electric field.

* * * * *